US011778337B2

(12) United States Patent
Hyun et al.

(10) Patent No.: US 11,778,337 B2
(45) Date of Patent: Oct. 3, 2023

(54) IMAGE SENSOR AND METHOD FOR SENSING IMAGE

(71) Applicant: Samsung Electronics Co., Ltd., Suwon-si (KR)

(72) Inventors: Eun Jae Hyun, Seoul (KR); Seong Yeong Jeong, Suwon-si (KR); Hee Kang, Hwaseong-si (KR); Hyoung Seok Ko, Suwon-si (KR); Young Jun Song, Seoul (KR); Jong Min You, Seongnam-si (KR); Chan Young Jang, Pohang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/880,516

(22) Filed: Aug. 3, 2022

(65) Prior Publication Data

US 2023/0144410 A1  May 11, 2023

(30) Foreign Application Priority Data

Nov. 9, 2021 (KR) .......................... 10-2021-0153240
Dec. 8, 2021 (KR) .......................... 10-2021-0174483

(51) Int. Cl.
*H04N 23/84* (2023.01)
*H04N 25/11* (2023.01)
*H04N 25/75* (2023.01)
*H04N 25/77* (2023.01)
*H04N 25/79* (2023.01)
*H04N 25/46* (2023.01)

(52) U.S. Cl.
CPC ........... *H04N 23/843* (2023.01); *H04N 25/11* (2023.01); *H04N 25/75* (2023.01); *H04N 25/77* (2023.01); *H04N 25/79* (2023.01)

(58) Field of Classification Search
CPC ...... H04N 23/843; H04N 25/11; H04N 25/75; H04N 25/77; H04N 25/79; H04N 25/134; H04N 25/46; H04N 25/778
See application file for complete search history.

(56) References Cited

U.S. PATENT DOCUMENTS

| 9,001,233 | B2 | 4/2015 | Kasai |
| 9,137,452 | B2 | 9/2015 | Han |
| 9,288,457 | B2 | 3/2016 | Saito |
| 9,584,742 | B2 | 2/2017 | Park et al. |

(Continued)

*Primary Examiner* — Marly S Camargo
(74) *Attorney, Agent, or Firm* — Muir Patent Law, PLLC

(57) ABSTRACT

An image sensor having improved image quality is provided. The image sensor includes a first array of pixels, a second array of pixels, and a binning module. The first array of pixels has a color pattern formed in an n×m array and includes at least first-color pixels, second-color pixels, and third color-pixels. The second array of pixels is adjacent to the first array of pixels and has the same color pattern formed in an n×m array as the first array of pixels, to include at least first-color pixels, second-color pixels, and third color-pixels. The binning module is configured to, for a sensed image: perform binning on the first-color pixels of the first array, the first-color pixels of the second array, the second-color pixels of the first array, and the third-color pixels of the second array, and not perform binning on the third-color pixels of the first array, and not perform binning on the second-color pixels of the second array.

20 Claims, 27 Drawing Sheets

(56) References Cited

U.S. PATENT DOCUMENTS

| | | |
|---|---|---|
| 9,628,725 B2 | 4/2017 | Roh et al. |
| 9,699,429 B2 | 7/2017 | Kaizu |
| 11,089,242 B2 | 8/2021 | Min et al. |
| 2012/0026368 A1* | 2/2012 | Cote ............... G06T 3/4015 348/242.3 |
| 2015/0350575 A1* | 12/2015 | Agranov ............ H04N 25/134 348/292.5 |
| 2021/0075769 A1* | 3/2021 | Liu ............... H04N 25/58 |
| 2021/0289150 A1* | 9/2021 | Kang ............... H04N 25/134 |
| 2021/0295096 A1* | 9/2021 | Vu et al. ............. H04N 25/46 |
| 2021/0409624 A1* | 12/2021 | Powell ............. H04N 25/46 |
| 2022/0094862 A1* | 3/2022 | Jung ............... H04N 25/46 |
| 2023/0108515 A1* | 4/2023 | Beshinski ........... H04N 25/46 |
| 2023/0127881 A1* | 4/2023 | Ogasahara ........... H04N 9/73 |

\* cited by examiner

100

100

IMGS1

| W1a | G1a | W2a | G2a | W1b | G1b | W2b | G2b |
|-----|-----|-----|-----|-----|-----|-----|-----|
| R1a | W3a | B1a | W4a | R1b | W3b | B1b | W4b |
| W5a | G3a | W6a | G4a | W5b | G3b | W6b | G4b |
| B2a | W7a | R2a | W8a | B2b | W7b | R2b | W8b |
| W1c | G1c | W2c | G2c | W1d | G1d | W2d | G2d |
| R1c | W3c | B1c | W4c | R1d | W3d | B1d | W4d |
| W5c | G3c | W6c | G4c | W5d | G3d | W6d | G4d |
| B2c | W7c | R2c | W8c | B2d | W7d | R2d | W8d |

IMGS3

FIG. 26

IMGSQ1

| W1a | G1a | W2a | G2a |
|-----|-----|-----|-----|
| R1a | W3a | B1a | W4a |
| W5a | G3a | W6a | G4a |
| B2a | W7a | R2a | W8a |

IMAGE SENSOR AND METHOD FOR SENSING IMAGE

CROSS-REFERENCE TO RELATED APPLICATION

This application claims priority from Korean Patent Application No. 10-2021-0153240 filed on Nov. 9, 2021 and Korean Patent Application No. 10-2021-0174483 filed on Dec. 8, 2021 in the Korean Intellectual Property Office, and all the benefits accruing therefrom under 35 U.S.C. 119, the contents of which in its entirety are herein incorporated by reference.

BACKGROUND

Field

The present disclosure relates to an image sensor, and a method for sensing an image.

Description of Related Art

An image sensing device refers to a semiconductor element that converts optical information into an electrical signal. The image sensing device may include a charge-coupled device (CCD) and a CMOS (complementary metal-oxide semiconductor) image sensing device.

The CMOS image sensing device may be described as a CMOS image sensor, which may be abbreviated as CIS (CMOS image sensor). The CIS may include a plurality of pixels arranged two-dimensionally. Each of the pixels may include, for example, a photodiode (PD). The photodiode may serve to convert incident light thereto into an electrical signal.

Recently, under development of the computer industry and the communication industry, demand for an image sensor with improved performance is increasing in various fields such as a digital camera, a camcorder, a smartphone, a game device, a security camera, a medical micro camera, a robot, and a vehicle.

SUMMARY

Aspects of the present disclosure provide an image sensor having improved image quality.

Further, aspects of the present disclosure provide a method for sensing an image with improved image quality.

Aspects according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

According to an aspect of the present disclosure, an image sensor includes a first pixel, a second pixel, a third pixel and a fourth pixel arranged in a first direction, a fifth pixel, a sixth pixel, a seventh pixel and an eighth pixel respectively disposed adjacent to the first to fourth pixels in a second direction intersecting the first direction, wherein the fifth to eighth pixels are arranged in the first direction, a ninth pixel, a tenth pixel, an eleventh pixel and a twelfth pixel respectively disposed adjacent to the fifth to eighth pixels in the second direction, wherein the ninth to twelfth pixels are arranged in the first direction, a thirteenth pixel, a fourteenth pixel, a fifteenth pixel and a sixteenth pixel respectively disposed adjacent to the ninth to twelfth pixels in the second direction, wherein the thirteenth to sixteenth pixels are arranged in the first direction, a first analog to digital converter connected to the first pixel, the third pixel, the fifth pixel, the seventh pixel, the ninth pixel, the eleventh pixel, the thirteenth pixel and the fifteenth pixel, and a second analog to digital converter connected to the second pixel, the fourth pixel, the sixth pixel, the eighth pixel, the tenth pixel, the twelfth pixel, the fourteenth pixel and the sixteenth pixel, wherein each of the first to sixteenth pixels is configured to output first to sixteenth pixel signals, respectively, wherein the first analog to digital converter is configured to perform binning based on only the first pixel signal, the third pixel signal, the ninth pixel signal and the eleventh pixel signal to output a first binned signal, and perform binning based on only the fifth pixel signal and the fifteenth pixel signal to output a second binned signal, wherein the second analog to digital converter is configured to perform binning based only on the sixth pixel signal, the eighth pixel signal, the fourteenth pixel signal and the sixteenth pixel signal to output a third binned signal, and perform binning based only on the second pixel signal, the fourth pixel signal, the tenth pixel signal, and the twelfth pixel signal to output a fourth binned signal.

According to an aspect of the present disclosure, an image sensor includes a first pixel array configured to output, for a sensed image, a plurality of first white pixel values, a plurality of first green pixel values, a plurality of first red pixel values, and a plurality of first blue pixel values, a second pixel array configured to output, for a sensed image, a plurality of second white pixel values, a plurality of second green pixel values, a plurality of second red pixel values, and a plurality of second blue pixel values, and a binning module connected to the first pixel array and the second pixel array, wherein the binning module is configured to perform binning based on the first white pixel values to generate a first white binned pixel value to perform binning based on the first green pixel values to generate a first green binned pixel value to perform binning based on the first red pixel values to generate a first red binned pixel value to perform binning based on the second white pixel values to generate a second white binned pixel value to perform binning based on the second green pixel values to generate a second green binned pixel value, to perform binning based on the second blue pixel values to generate a second blue binned pixel value, to not perform binning based on the first blue pixel values, and to not perform binning based on the second red pixel values.

According to an aspect of the present disclosure, an image sensor includes a first array of pixels, a second array of pixels, and a binning module. The first array of pixels has a color pattern formed in an n×m array and includes at least first-color pixels, second-color pixels, and third color-pixels. The second array of pixels is adjacent to the first array of pixels and has the same color pattern formed in an n×m array as the first array of pixels, to include at least first-color pixels, second-color pixels, and third color-pixels. The binning module is configured to, for a sensed image: perform binning on the first-color pixels of the first array, the first-color pixels of the second array, the second-color pixels of the first array, and the third-color pixels of the second array, and not perform binning on the third-color pixels of the first array, and not perform binning on the second-color pixels of the second array.

According to an aspect of the present disclosure, an image sensor includes a first white pixel group, a first green pixel group, a second white pixel group and a second green pixel group arranged in a first direction, a first red pixel group adjacent to the first white pixel group in a second direction intersecting the first direction, a third white pixel group, a first blue pixel group and a fourth white pixel group arranged from the first red pixel group in the first direction, a fifth white pixel group adjacent to the first red pixel group in the second direction, a third green pixel group, a sixth white pixel group, and a fourth green pixel group arranged from the fifth white pixel group in the first direction, a second blue pixel group adjacent to the fifth white pixel group in the second direction, a seventh white pixel group, a second red pixel group, and an eighth white pixel group arranged from the second blue pixel group in the first direction, and a binning module connected to the first to eighth white pixel groups, the first to fourth green pixel groups, the first and second red pixel groups, and the first and second blue pixel groups, wherein each of the first to eighth white pixel groups includes a plurality of white pixels, wherein each of the first to fourth green pixel groups includes a plurality of green pixels, wherein each of the first and second red pixel groups includes a plurality of red pixels, wherein each of the first and second blue pixel groups includes a plurality of blue pixels, wherein the binning module is configured to perform binning based on signal values of the first, second, fifth and sixth white pixel groups to generate a first white binned pixel value, to perform binning based on signal values of the first to fourth green pixel groups to generate a first green binned pixel value, to perform binning based on signal values of the first and second red pixel groups to generate a first red binned pixel value, and to not perform binning based on signal values of the first and second blue pixel groups.

According to an aspect of the present disclosure, a method for sensing an image includes generating a plurality of first first-color pixel values, a plurality of first second-color pixel values, a plurality of first third-color pixel values, and a plurality of first fourth-color pixel values, generating a plurality of second first-color pixel values, a plurality of second second-color pixel values, a plurality of second third-color pixel values, and a plurality of second fourth-color pixel values, performing binning based on the first first-color pixel values to generate a first first-color binned pixel value, performing binning based on the first second-color pixel values to generate a first second-color binned pixel value, performing binning based on the first third-color pixel values to generate a first third-color binned pixel value, performing binning based on the second first-color pixel values to generate a second first-color binned pixel value, performing binning based on the second second-color pixel values to generate a second second-color binned pixel value, and performing binning based on the second fourth-color pixel values to generate a second fourth-color binned pixel value, wherein binning based on the first fourth-color pixel values is not performed, and wherein binning based on the second third-color pixel values is not performed.

Other features and embodiments may be apparent from the following detailed description, the drawings and the claims.

BRIEF DESCRIPTION OF DRAWINGS

The above and other aspects and features of the present disclosure will become more apparent by describing in detail exemplary embodiments thereof with reference to the attached drawings, in which:

FIG. 26 is a diagram for illustrating a first quad image signal generated from FIG. 25.

DETAILED DESCRIPTIONS

Figure 1:
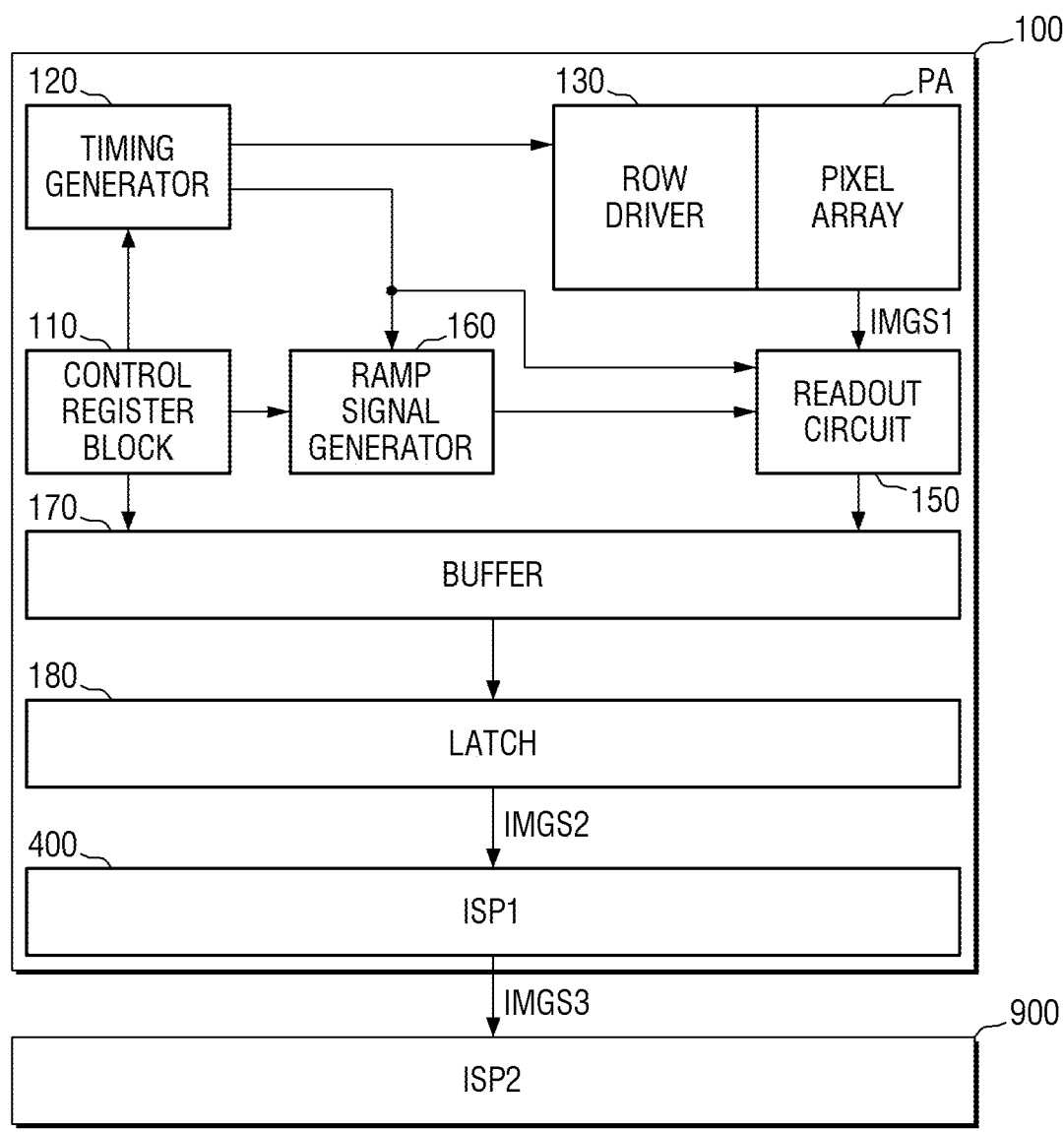
FIG. 1 is a block diagram of an image sensing device according to some embodiments.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are exemplary, and the present disclosure is not limited thereto.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present. In contrast, when an element is referred to as being "directly connected" or "directly coupled" to another element, or as "contacting" or "in contact with" another element, there are no intervening elements present at the point of contact.

Further, as used herein, when a layer, film, region, plate, or the like may be disposed "on" or "on a top" of another layer, film, region, plate, or the like, the former may contact the latter or still another layer, film, region, plate, or the like may be disposed between the former and the latter. As used herein, when a layer, film, region, plate, or the like is directly disposed "on" or "on a top" of another layer, film, region, plate, or the like, the former contacts the latter and still another layer, film, region, plate, or the like is not disposed between the former and the latter. Further, as used herein, when a layer, film, region, plate, or the like may be disposed "below" or "under" another layer, film, region, plate, or the like, the former may contact the latter or still another layer, film, region, plate, or the like may be disposed between the former and the latter. As used herein, when a layer, film, region, plate, or the like is directly disposed "below" or "under" another layer, film, region, plate, or the like, the former contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various embodiments of the present disclosure may be partially or entirely combined with each other, and may be technically associated with each other or operate with each other. The embodiments may be implemented independently of each other and may be implemented together in an association relationship.

Spatially relative terms, such as "beneath," "below," "lower," "under," "above," "upper," and the like, may be used herein for ease of explanation for illustrating one element or feature's relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented, for example, rotated 90 degrees or at other orientations, and the spatially relative descriptors used herein should be interpreted accordingly.

Terms as used herein "first direction X", "second direction Y" and "third direction Z" should not be interpreted only to have a geometric relationship in which the first direction, the second direction, and the third direction are perpendicular to each other. The "first direction X", "second direction Y" and "third direction Z" may be interpreted to have a broader direction within a range in which components herein may work functionally.

Hereinafter, embodiments of the present disclosure will be described in detail with reference to the accompanying drawings.

FIG. 1 is a block diagram of an image sensing device according to some embodiments.

Referring to FIG. 1, an image sensing device 1 may include an image sensor 100 and a second image signal processor 900.

The image sensor 100 may sense an image of a sensing target using light to generate a first image signal IMGS1. In some embodiments, the generated first image signal IMGS1 may be, for example, a digital signal. Embodiment according to the present disclosure are not limited thereto.

A first image signal IMGS1 may be provided to a readout circuit 150, a buffer 170, and a latch 180 and may be subjected to binning. Accordingly, the first image signal IMGS1 may be subjected to the binning operation which may output a second image signal IMGS2. The image sensor 100 may perform analog binning on the first image signal IMGS1.

A first image signal processor 400 may perform correction on the second image signal IMGS2 to output a third image signal IMGS3.

The third image signal IMGS3 may be provided to and processed by the second image signal processor 900. The second image signal processor 900 may process the received third image signal IMGS3 so as to be easily displayed on a display.

In some embodiments, the second image signal processor 900 may perform digital binning on the third image signal IMGS3 output from the image sensor 100. In this regard, the third image signal IMGS3 output from the image sensor 100 may be the third image signal IMGS3 on which the analog binning has already been performed.

In some embodiments, the image sensor 100 and the second image signal processor 900 may be disposed separately from each other as illustrated. For example, the image sensor 100 may be mounted on or may be part of a first chip and the second image signal processor 900 may be mounted on or may be part of a second chip and the first chip and second chip may communicate with each other via a predetermined interface. The first chip and second chip may be semiconductor chips that are part of separate packages. However, embodiments are not limited thereto. The image sensor 100 and the second image signal processor 900 may be implemented into a single package, for example, an MCP (multi-chip package having a package substrate on which two or more chips are mounted).

The image sensor 100 may include a control register block 110, a timing generator 120, a row driver 130, a pixel array PA, the readout circuit 150, a ramp signal generator 160, the buffer 170, the latch 180, and the first image signal processor 400.

The control register block 110 may control overall operations of the image sensor 100. In particular, the control register block 110 may transmit an operation signal directly to the timing generator 120, the ramp signal generator 160 and the buffer 170. In some embodiments, the control register block 110 may control the image sensor 100 to perform a binning operation on the first image signal IMGS1. As is traditional in the field of the disclosed technology, features and embodiments may be described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The timing generator 120 may generate a signal as a reference for operation timings of various components of the image sensor 100. The operation timing reference signal generated from the timing generator 120 may be transmitted to the row driver 130, the readout circuit 150, the ramp signal generator 160, and the like.

The ramp signal generator 160 may generate and transmit a ramp signal used for the readout circuit 150. For example, the readout circuit 150 may include a correlated double sampler (CDS), a comparator, etc. The ramp signal generator 160 may generate and transmit the ramp signal used for the correlated double sampler (CDS), the comparator, and the like.

The buffer 170 may temporarily store therein the first image signal IMGS1 or the second image signal IMSG2. For example, the buffer 170 may store therein the generated second image signal IMGS2 in a binning mode. In a non-binning mode, the buffer 170 may store therein the generated first image signal IMGS1. Further, the latch 180 may latch and output the first image signal IMGS1 or the second image signal IMGS2 buffered in the buffer 170. Each of the buffer 170 and the latch 180 may include a memory such as DRAM or SRAM.

The pixel array PA may sense an external image. The pixel array PA may include a plurality of pixels or unit pixels. The row driver 130 may selectively activate a row of the pixel array PA.

The readout circuit 150 may sample a pixel signal received from the pixel array PA, compare the sampled pixel signal with the ramp signal, and convert an analog image signal (data) into a digital image signal (data) based on the comparison result. For example, the readout circuit 150 may convert the first image signal IMGS1 from the pixel array PA into the digital image signal. In some embodiments, the readout circuit 150 may perform a binning operation on the first image signal IMGS1 to output the second image signal IMGS2.

The first image signal processor 400 may receive the second image signal IMSG2 from the latch 180. The first image signal processor 400 may be disposed separately from the second image signal processor 900. For example, the first image signal processor 400 may be disposed in the image sensing device 1, while the second image signal processor 900 may be implemented as an application processor or the like. The first image signal processor 400 may perform correction on the second image signal IMGS2 to generate the third image signal IMGS3.

Figure 2:
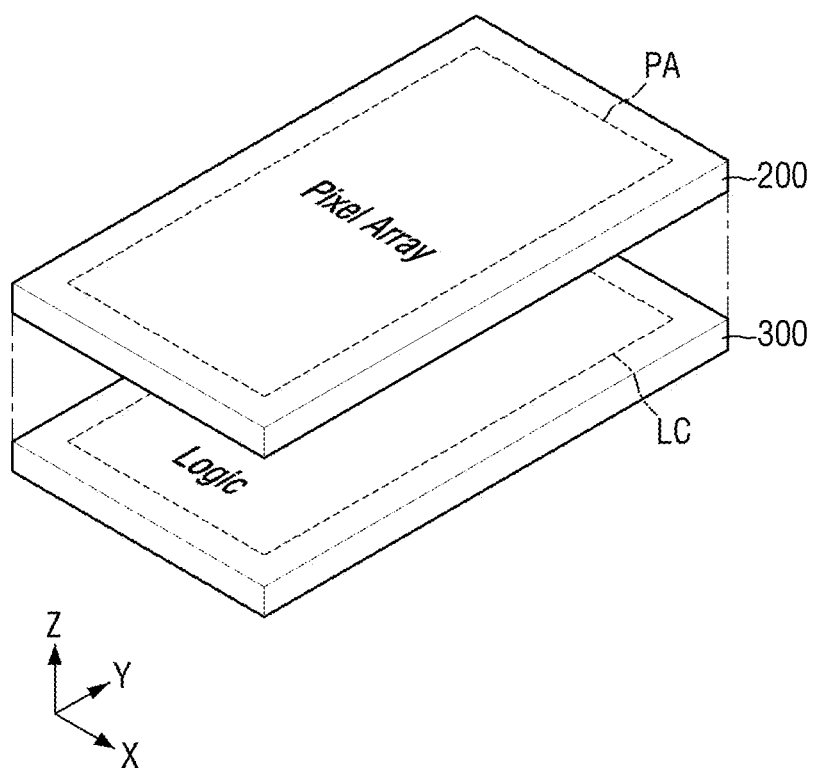
FIG. 2 is a diagram showing a conceptual layout of an image sensor according to some embodiments.

FIG. 2 is a diagram showing a conceptual layout of an image sensor according to some embodiments.

Referring to FIG. 2, the image sensor 100 of this embodiment may include an upper chip 200 and a lower chip 300 as stacked. Each chip may be formed on a die from a wafer. A plurality of pixels may be arranged in the upper chip 200 in a two-dimensional array structure. That is, the upper chip 200 may include the pixel array PA. The lower chip 300 may include a logic area LC and a memory area. The lower chip 300 may be disposed under the upper chip 200 and may be electrically connected to the upper chip 200. The lower chip 300 may allow the pixel signal transmitted from the upper chip 200 to be transmitted to the logic area LC of the lower chip 300.

Logic elements may be disposed in the logic area LC of the lower chip 300. The logic elements may include circuits for processing a pixel signal from each of the pixels. For example, the logic elements may include the control register block 110, the timing generator 120, the row driver 130, the readout circuit 150, the ramp signal generator 160, the first image signal processor 400, and the like in FIG. 1. Further, memory elements may be disposed in the lower chip 300. For example, the buffer 170 and the latch 180 may be disposed in the lower chip 300.

Figure 3:
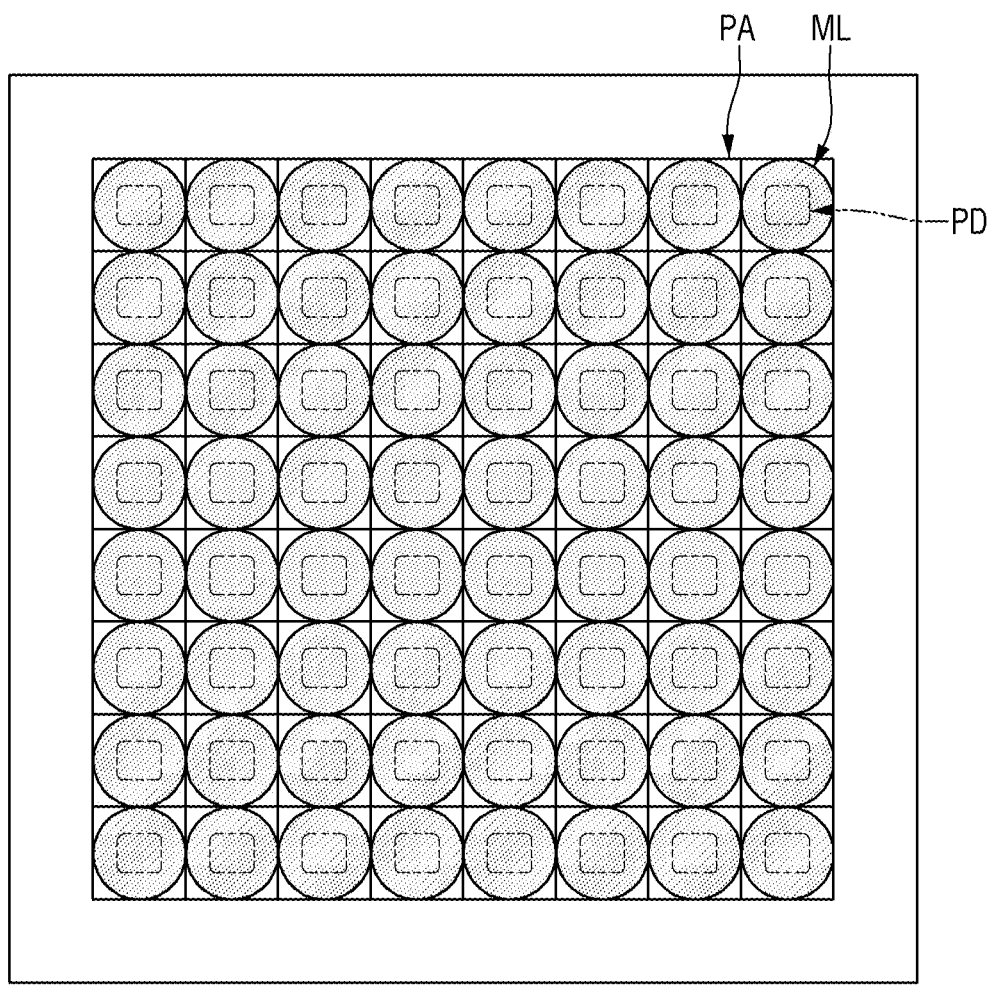
FIG. 3 is a top view of an image sensor according to some embodiments.
Figure 3:
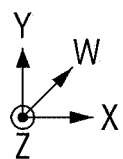
Figure 4:
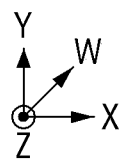
FIG. 4 is a diagram for illustrating a first image signal output from the pixel array of FIG. 3.

FIG. 3 is a top view of an image sensor according to some embodiments. FIG. 4 is a diagram for illustrating a first image signal output from the pixel array of FIG. 3.

Referring to FIG. 3, the pixel array PA may be disposed on the top face of the image sensor 100.

In detail, the pixel array PA may constitute a top face of the upper chip 200 of the image sensor 100. The pixel array PA may include a plurality of micro lenses ML and a plurality of photodiodes PD. The pixel array PA may include a plurality of pixels regularly arranged in a first direction X and a second direction Y, which may be perpendicular to the first direction X. In this regard, the micro lens ML may constitute a top face of each pixel. The photodiode PD may be disposed in each pixel. When light is incident on the photodiode PD through the micro lens ML, the photodiode PD may convert the light into an electrical signal and output the electrical signal.

Referring to FIG. 4, the first image signal IMGS1 output from the pixel array PA of FIG. 3 may include first to eighth white pixel values W1a to W8a, first to fourth green pixel values G1a to G4a, first and second red pixel values R1a and R2a, and first and second blue pixel values B1a and B2a. Further, the first image signal IMGS1 may include first to eighth white pixel values W1b to W8b, first to fourth green pixel values G1b to G4b, first and second red pixel values R1b and R2b, first and second blue pixel values B1b and B2b, first to eighth white pixel values W1c to W8c, first to fourth green pixel values G1c to G4c, first and second red pixel values R1c and R2c, first and second blue pixel values B1c and B2c, first to eighth white pixel values W1d to W8d, first to fourth green pixel values G1d to G4d, first and second red pixel values R1d and R2d, and first and second blue pixel values B1d and B2d.

For example, the pixel array PA may be configured to have a pattern including 8 white pixels, 4 green pixels, 2 red pixels and 2 blue pixels. Each of the green pixels may be surrounded with white pixels. Each of the red pixels may be surrounded with white pixels. Each of the blue pixels may be surrounded with white pixels. Each of the white pixels may be surrounded with the green pixels, the red pixel and the blue pixel. In this regard, the pixel array PA may be arranged in an RGBW pattern. The pattern may be caused by different color filters that allow only a certain color to pass through (e.g., red, green, blue, or white). In this manner, a pixel described as a certain color pixel may have a color filter of that described color, or that only allows that color to pass through.

In this embodiment, although the first image signal IMGS1 is described based on the first to eighth white pixel values W1a to W8a, the first to fourth green pixel values G1a to G4a, the first and second red pixel values R1a and R2a, and the first and second blue pixel values B1a and B2a, the description is equally applied to other pixel values.

The first white pixel value W1a, the first green pixel value G1a, the second white pixel value W2a, and the second green pixel value G2a may be sequentially arranged in the first direction X. The first red pixel value R1a, the third white pixel value W3a, the first blue pixel value B1a and the fourth white pixel value W4a may be disposed adjacent to the first white pixel value W1a in the second direction Y, the first green pixel value G1a, the second white pixel value W2a and the second green pixel value G2a, respectively. Further, the first red pixel value R1a, the third white pixel value W3a, the first blue pixel value B1a and the fourth white pixel value W4a may be sequentially arranged in the first direction X.

The fifth white pixel value W5a, the third green pixel value G3a, the sixth white pixel value W6a and the fourth green pixel value G4a may be disposed in adjacent to the first red pixel value R1a in the second direction Y, the third white pixel value W3a, the first blue pixel value B1a and the fourth white pixel value W4a, respectively. The fifth white pixel value W5a, the third green pixel value G3a, the sixth white pixel value W6a and the fourth green pixel value G4a may be sequentially arranged in the first direction X.

The second blue pixel value B2a, the seventh white pixel value W7a, the second red pixel value R2a and the eighth white pixel value W8a may be disposed in adjacent to the fifth white pixel value W5a in the second direction Y, the third green pixel value G3a, the sixth white pixel value W6a and the fourth green the pixel value G4a, respectively. The second blue pixel value B2a, the seventh white pixel value W7a, the second red pixel value R2a and the eighth white pixel value W8a may be sequentially arranged in the first direction X.

In this regard, an array of the pixel values may correspond to an array of pixels corresponding to the pixel values.

In some embodiments, the first blue pixel value B1a and the second blue pixel value B2a may be arranged in a fourth direction W. In this regard, the fourth direction W may be an oblique direction defining an acute angle relative to the first direction X and defining an acute angle relative to the second direction Y. For example, the fourth direction W may define an angle of 45 degrees relative to the first direction X, and may define an angle of 45 degrees relative to the second direction Y. The fourth direction W may correspond to a diagonal direction. The first blue pixel value B1a and the second blue pixel value B2a may be arranged in the fourth direction W while the third green pixel value G3a is interposed therebetween. Items being described as arranged in a particular direction are disposed along an imaginary straight line extending in the particular direction.

In some embodiments, the first red pixel value R1a and the second red pixel value R2a may be arranged in a direction intersecting the fourth direction W. The third green pixel value G3a may be disposed between the first red pixel value R1a and the second red pixel value R2a.

Figure 5:
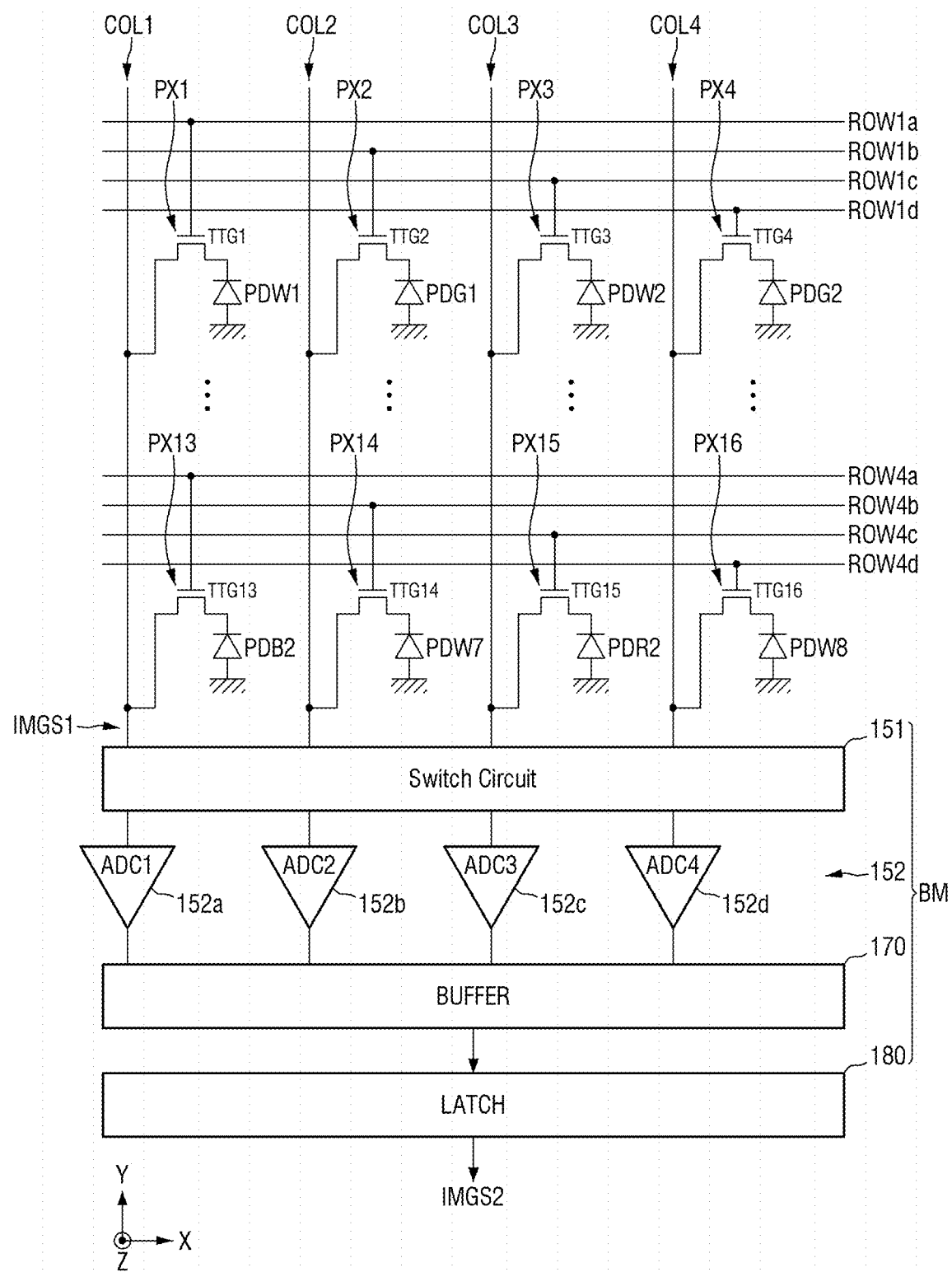
FIG. 5 is a circuit diagram of an image sensor according to some embodiments.

FIG. 5 is a circuit diagram of an image sensor according to some embodiments.

Referring to FIG. 5, first to sixteenth pixels PX1 to PX16 may be regularly arranged. In this regard, the first to sixteenth pixels PX1 to PX16 may output the first to eighth white pixel values W1a to W8a, the first to fourth green pixel values G1a to G4a, the first and second red pixel values R1a and R2a, and the first and second blue pixel values B1a and B2a of the first image signal IMGS1 of FIG. 4 and may correspond thereto.

The first to fourth pixels PX1 to PX4 may be arranged in the first direction X. The fifth to eighth pixels PX5 to PX8 may be disposed adjacent to the first to fourth pixels PX1 to PX4 in the second direction Y, respectively, and may be arranged in the first direction X. The ninth to twelfth pixels PX9 to PX12 may be disposed adjacent to the fifth to eighth pixels PX5 to PX8 in the second direction Y, respectively, and may be arranged in the first direction X. The thirteenth to sixteenth pixels PX13 to PX16 may be disposed adjacent to the ninth to twelfth pixels PX9 to PX12 in the second direction Y, respectively, and may be arranged in the first direction X.

A plurality of row lines ROW1a to ROW1d, ROW2a to ROW2d, ROW3a to ROW3d, ROW4a to ROW4d may be arranged in the second direction Y and may extend in the first direction X. A plurality of column lines COL1 to COL4 may be arranged in the first direction X and may extend in the second direction Y. The plurality of row lines ROW1a to ROW1d, ROW2a to ROW2d, ROW3a to ROW3d, and ROW4a to ROW4d and the plurality of column lines COL1 to COL4 may intersect with each other at intersection points and may be connected to (e.g., physically and electrically connected to) the first to sixteenth pixels PX1 to PX16 at the intersection points.

The first pixel PX1 may include a first white photodiode PDW1, and a first transmission transistor TTG1 connected to the first row line ROW1a, and the first column line COL1. The second pixel PX2 may include a first green photodiode PDG1, and a second transmission transistor TTG2 connected to the first row line ROW1b, and the second column line COL2. The third pixel PX3 may include a second white photodiode PDW2, and a third transmission transistor TTG3 connected to the first row line ROW1c and the third column line COL3. The fourth pixel PX4 may include a second green photodiode PDG2, and a fourth transmission transistor TTG4 connected to the first row line ROW1d and the fourth column line COL4.

The thirteenth pixel PX13 may include a second blue photodiode PDB2, and a thirteenth transmission transistor TTG13 connected to the fourth row line ROW4a, and the first column line COL1. The fourteenth pixel PX14 may include a seventh white photodiode PDW7a, and a fourteenth transmission transistor TTG14 connected to the fourth row line ROW4b and the second column line COL2. The fifteenth pixel PX15 may include a second red photodiode PDR2, and a fifteenth transmission transistor TTG15 connected to the fourth row line ROW4c and the third column line COL3. The sixteenth pixel PX16 may include an eighth white photodiode PDW8, and a sixteenth transmission transistor TTG16 connected to the fourth row line ROW4d and the fourth column line COL4. In some embodiments, the red and blue photodiodes may be swapped with each other so that red photodiodes are placed where the blue photodiodes are shown in FIG. 4, and blue photodiodes are placed where the red photodiodes are shown in FIG. 4.

The image sensor 100 may include a binning module BM including a switch circuit 151, an analog to digital converter 152, the buffer 170 and latch 180. In this regard, the binning module BM may be controlled by the control register block 110.

The switch circuit 151 may be connected to the first to fourth column line COL1 to COL4, and may receive the first image signal IMGS1 via the first to fourth column lines COL1 to COL4. Further, the switch circuit 151 may be connected to first to fourth analog to digital converters 152a to 152d. The switch circuit 151 may selectively connect the first to fourth column lines COL1 to COL4 to the first to fourth analog to digital converters 152a to 152d. Accordingly, binning may be performed on the first image signal IMGS1.

The first pixel PX1, the fifth pixel PX5, the ninth pixel PX9 and the thirteenth pixel PX13 may be connected to the first column line COL1 and may respectively provide the first white pixel value W1a, the first red pixel value R1a, the fifth white pixel value W5a and the second blue pixel value B2a to the switch circuit 151.

The second pixel PX2, the sixth pixel PX6, the tenth pixel PX10 and the fourteenth pixel PX14 may be connected to the second column line COL2, and may respectively provide the first green pixel value G1a, the third white pixel value W3a, the third green pixel value G3a and the seventh white pixel value W7a to the switch circuit 151.

The third pixel PX3, the seventh pixel PX7, the eleventh pixel PX11 and the fifteenth pixel PX15 may be connected to the third column line COL3, and may respectively provide the second white pixel value W2a, the first blue pixel value B1a, the sixth white pixel value W6a and the second red pixel value R2a to the switch circuit 151.

The fourth pixel PX4, the eighth pixel PX8, the twelfth pixel PX12 and the sixteenth pixel PX16 may be connected to the fourth column line COL4, and may respectively provide the second green pixel value G2a, the fourth white pixel value W4a, the fourth green pixel value G4a and the eighth white pixel value W8a to the switch circuit 151.

The switch circuit 151 may connect the first to fourth column lines COL1 to COL4 to one of the first to fourth analog to digital converters 152a to 152d to perform the binning on the pixel values. The analog to digital converter 152 may convert the received pixel values into a digital signal. Further, the analog to digital converter 152 may perform binning on the received pixel values. The buffer 170 may buffer therein the binned pixel values, and the latch 180 may latch the buffered binned pixel value to output the second image signal IMGS2.

Hereinafter, a binning operation on the first image signal IMGS1 will be described with reference to FIG. 5 to FIG. 11.

Figure 6:
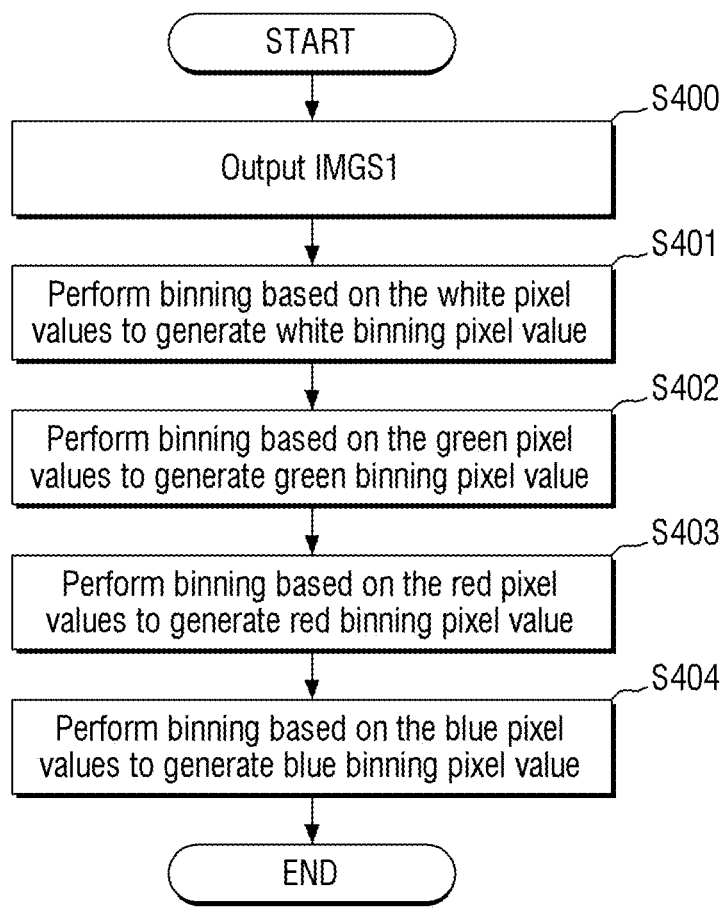
FIG. 6 is a flowchart for illustrating the binning operation on the first image signal.

FIG. 6 is a flowchart for illustrating the binning operation on the first image signal. FIG. 7 to FIG. 11 are diagrams for illustrating a method for performing binning on the first image signal to generate the second image signal.

Referring to FIG. 5 and FIG. 6, the first to sixteenth pixels PX1 to PX16 may output the first image signal IMGS1 in S400. The first to eighth white pixel values W1a to W8a, the first to fourth green pixel values G1a to G4a, the first and second red pixel values R1a and R2a and the first and second blue pixel values B1a and B2a included in the first image signal IMGS1 may be transmitted to the binning module BM.

Figure 7:
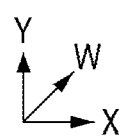
FIG. 7 to FIG. 11 are diagrams for illustrating a method for performing binning on the first image signal to generate the second image signal.

Referring to FIG. 5 to FIG. 7, the image sensor 100 may perform binning based on the white pixel values to generate a white binned pixel value in S401. The image sensor 100 may perform binning based on the first white pixel value W1a, the second white pixel value W2a, the fifth white pixel value W5a and the sixth white pixel value W6a included in the first image signal IMGS1 to generate a first white binned pixel value W1a'. For example, the first white binned pixel value W1a' may correspond to a sum or an average of the first white pixel value W1a, the second white pixel value W2a, the fifth white pixel value W5a and the sixth white pixel value W6a. In this regard, the switch circuit 151 may connect the first column line COL1 to the first analog to digital converter 152a, and connect the third column line COL3 to the third analog to digital converter 152c. The analog to digital converter 152 may perform the binning thereon to generate the first white binned pixel value W1a'. The first white binned pixel value W1a' is shown in a particular position of IMGS2 in FIG. 7, and may be associated with this position in IMGS2. However, as discussed below, additional processes may be implemented to improve the image quality of the image output from the image sensor 100 and to change the positioning of certain pixel values.

The image sensor 100 may perform binning based on the third white pixel value W3a, the fourth white pixel value W4a, the seventh white pixel value W7a and the eighth white pixel value W8a included in the first image signal IMGS1 W2a' to generate a second white binned pixel value W2a'. For example, the second white binned pixel value W2a' may correspond to a sum or an average of the third white pixel value W3a, the fourth white pixel value W4a, the seventh white pixel value W7a and the eighth white pixel value W8a. In this regard, the switch circuit 151 may connect the second column line COL2 to the second analog to digital converter 152b, and connect the fourth column line COL4 to fourth analog to digital converter 152d. The analog to digital converter 152 may perform the binning thereon to generate the second white binned pixel value W2a'. Similar binning may be performed for the other groups of 16 pixels shown in FIG. 4 to generate third through eighth white binned pixel values.

Figure 8:
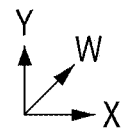
Figure 8:

Referring to FIG. 5, FIG. 6 and FIG. 8, the image sensor 100 may perform binning based on the green pixel values to generate a green binned pixel value in S402. The image sensor 100 may perform binning based on the first to fourth green pixel values G1a to G4a included in the first image signal IMGS1 to generate a first green binned pixel value G1a'. For example, the first green binned pixel value G1a' may correspond to a sum or an average of the first to fourth green pixel values G1a to G4a. In this regard, the switch circuit 151 may connect the second column line COL2 to the second analog to digital converter 152b, and connect the fourth column line COL4 to fourth analog to digital converter 152d. The analog to digital converter 152 may perform the binning thereon to generate the first green binned pixel value G1a'. Similar binning may be performed for the other groups of 16 pixels shown in FIG. 4 to generate second through fourth green binned pixel values.

Figure 9:
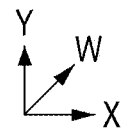

Referring to FIG. 5, FIG. 6 and FIG. 9, the image sensor 100 may perform binning based on the red pixel values to generate a red binned pixel value in S403. The image sensor 100 may perform binning based on the first and second red pixel values R1a and R2a included in the first image signal IMGS1 to generate a first red binned pixel value R1a'. For example, the first red binned pixel value R1a' may correspond to a sum or an average of the first and second red pixel values R1a and R2a. In this regard, the switch circuit 151 may connect the first column line COL1 to the first analog to digital converter 152a, and connect the third column line COL3 to the third analog to digital converter 152c. The analog to digital converter 152 may perform the binning thereon to generate the first red binned pixel value R1a'. Similar binning may be performed for first and second red pixel values R1d and R2d from one of the other groups of 16 pixels in FIG. 4 to generate a second red binned pixel value.

Figure 10:

Referring to FIG. 5, FIG. 6 and FIG. 10, the image sensor 100 may perform binning based on the blue pixel values to generate a blue binned pixel value in S404. The image sensor 100 may perform binning based on the first and second blue pixel values B1b and B2b included in the first image signal IMGS1 to generate a first blue binned pixel value B1b'. For example, the first blue binned pixel value B1b' may correspond to a sum or an average of the first and second blue pixel values B1b and B2b. In this regard, the switch circuit 151 may connect the first column line COL1 to the first analog to digital converter 152a, and connect the third column line COL3 to the third analog to digital converter 152c. The analog to digital converter 152 may perform the binning thereon to generate the first blue binned pixel value B1b'. Similar binning may be performed for one of the first and second blue pixel values B1c and B2c from the other groups of 16 pixels in FIG. 4 to generate a second blue binned pixel value. Though FIGS. 7-10 and steps S401-S404 in FIG. 6 are described in a particular order, these steps need not occur in that order, and may occur in other orders.

A group of 16 pixels as described above may have a repeated pattern throughout an image sensor, and may form a group of pixel arrays, formed in a larger array pattern. For example, a first pixel array may include pixels W1a, G1a, W2a, G2a, R1a, W3a, B1a, W4a, W5a, G3a, W6a, G4a, B2a, W7a, R2a, and W8a (see FIG. 4). A second pixel array may include pixels W1b, G1b, W2b, G2b, R1b, W3b, B1b, W4b, W5b, G3b, W6b, G4b, B2b, W7b, R2b, and W8b. More generally, groups of n×m pixels may be included in each array, where n and m are integers. The values n and m may be equal to each other, and in the embodiment of FIGS. 1-11, for example, are 4.

Figure 11:
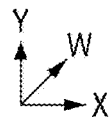

Referring to FIG. 11, the image sensor 100 may perform the binning based on the first image signal IMGS1 to generate the second image signal IMGS2. In this regard, the second image signal IMGS2 may include the first and second white binned pixel values W1a' and W2a', the first green binned pixel value G1a' and the first red binned pixel value R1a'. In this regard, the image sensor 100 may not perform binning based on the first blue pixel value B1a and the second blue pixel value B2a. That is, information on the first blue pixel value B1a and the second blue pixel value B2a may not be included in the second image signal IMGS2.

Further, the second image signal IMGS2 may include the first and second white binned pixel values W1b' and W2b', the first green binned pixel value G1b' and the first blue binned pixel value B1b', the first and second white binned pixel values W1c' and W2c', the first green binned pixel value G1c' and the first blue binned pixel value B1c', the first and second white binned pixel values W1d' and W2d', the first green binned pixel value G1d' and the first red binned pixel value R1d'.

The image sensor 100 may not perform binning based on the first red pixel value R1b and the second red pixel value R2b and may not perform binning based on the first red pixel value R1c and the second red pixel value R2c, and may not perform binning based on the first blue pixel value B1a and the second blue pixel value B2a and may not perform binning based on the first blue pixel value B1d and the second blue pixel value B2d. For example, the second image signal IMGS2 may not include information about the first red pixel value R1b, the second red pixel value R2b, the first red pixel value R1c, the second red pixel value R2c, the first blue pixel value B1a, the second blue pixel value B2a, the first blue pixel value B1d, and the second blue pixel value B2d. More generally speaking, when an n×m array of color pixels having a particular pattern is used and repeated in an image sensor (in this embodiment, where n and m are equal), groups of the n×m arrays may be used together in a binning process. In a group of k such arrays with k being 2 or more (e.g. a group of 4 as shown in FIG. 11), binning may be used in one array for a particular color pixel set (e.g., red pixels) and may not be used in another array for that same particular color pixel set (e.g., red pixels). For example, a first array having a color pattern of n×m pixels may be processed by performing binning for a first set of first-color pixels of the array (e.g., blue) without performing binning for a first set of second-color of pixels of the array (e.g., red), and an adjacent array having the same color pattern of n×m pixels may be processed by performing binning for a second set of second-color pixels (e.g., blue) without performing binning for a second set of first-color pixels (e.g., red). First-color pixels, second-color pixels, and third-color pixels as described herein are pixels having different colors from each other.

In summary, the image sensor 100 may perform the binning based on the first image signal IMGS1 output from the pixel array PA having the RGBW pattern to generate the second image signal IMGS2. The first image signal IMGS1 and second image signal IMGS2 may each represent, for example, a sensed image or a frame (e.g., a still image) that is sensed at a particular time. In this regard, the second image signal IMGS2 may be generated using a relatively simple binning method. Accordingly, the image sensor 100 that generates the binned image signal in a relatively simple manner while improving image quality may be provided.

Figure 12:
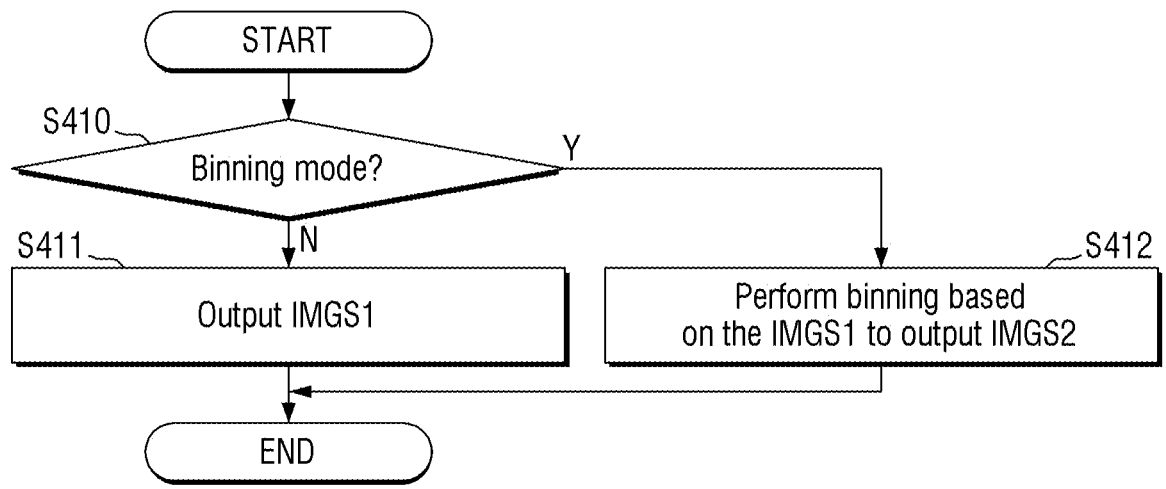
FIG. 12 is a flowchart for illustrating a binning mode of the image sensor.
Figure 13:
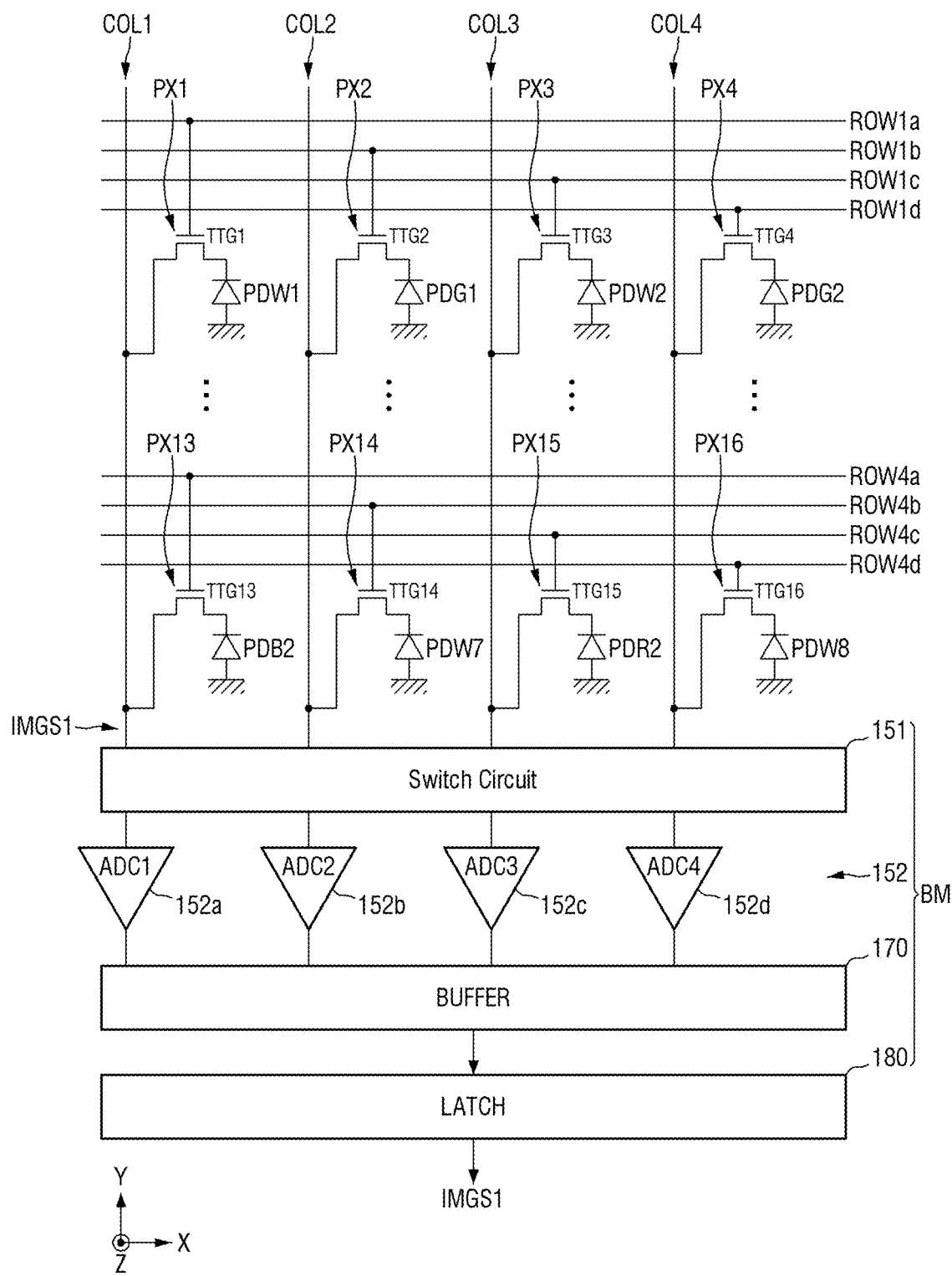
FIG. 13 is a circuit diagram to illustrate an operation of the image sensor in a non-binning mode.

FIG. 12 is a flowchart for illustrating a binning mode of the image sensor. FIG. 13 is a circuit diagram to illustrate an operation of the image sensor in a non-binning mode.

Referring to FIG. 12, the image sensor 100 may determine whether a mode of the image sensor is a binning mode in S410. When the mode is the binning mode (S410-Y), the image sensor 100 may perform binning based on the first image signal IMGS1 to output the second image signal IMGS2 in S412. For example, the image sensor 100 may generate the second image signal IMGS2 including the binned pixel values as described with reference to FIG. 1 to FIG. 11.

When the mode is not the binning mode (S410-N), the image sensor 100 may output the first image signal IMGS1 in S411. Referring to FIG. 13, when the mode is not the binning mode, the switch circuit 151 may connect each of the first to fourth column lines COL1 to COL4 to the first to fourth analog to digital converters 152a to 152d, respectively. In this regard, the binning module BM may not perform binning on the first image signal IMGS1. Accordingly, in this case, the binning module BM may output the first image signal IMGS1. That is, the binning module BM may output at least one of the first image signal IMGS1 or the second image signal IMGS2 depending on whether the mode is the binning mode.

Figure 14:
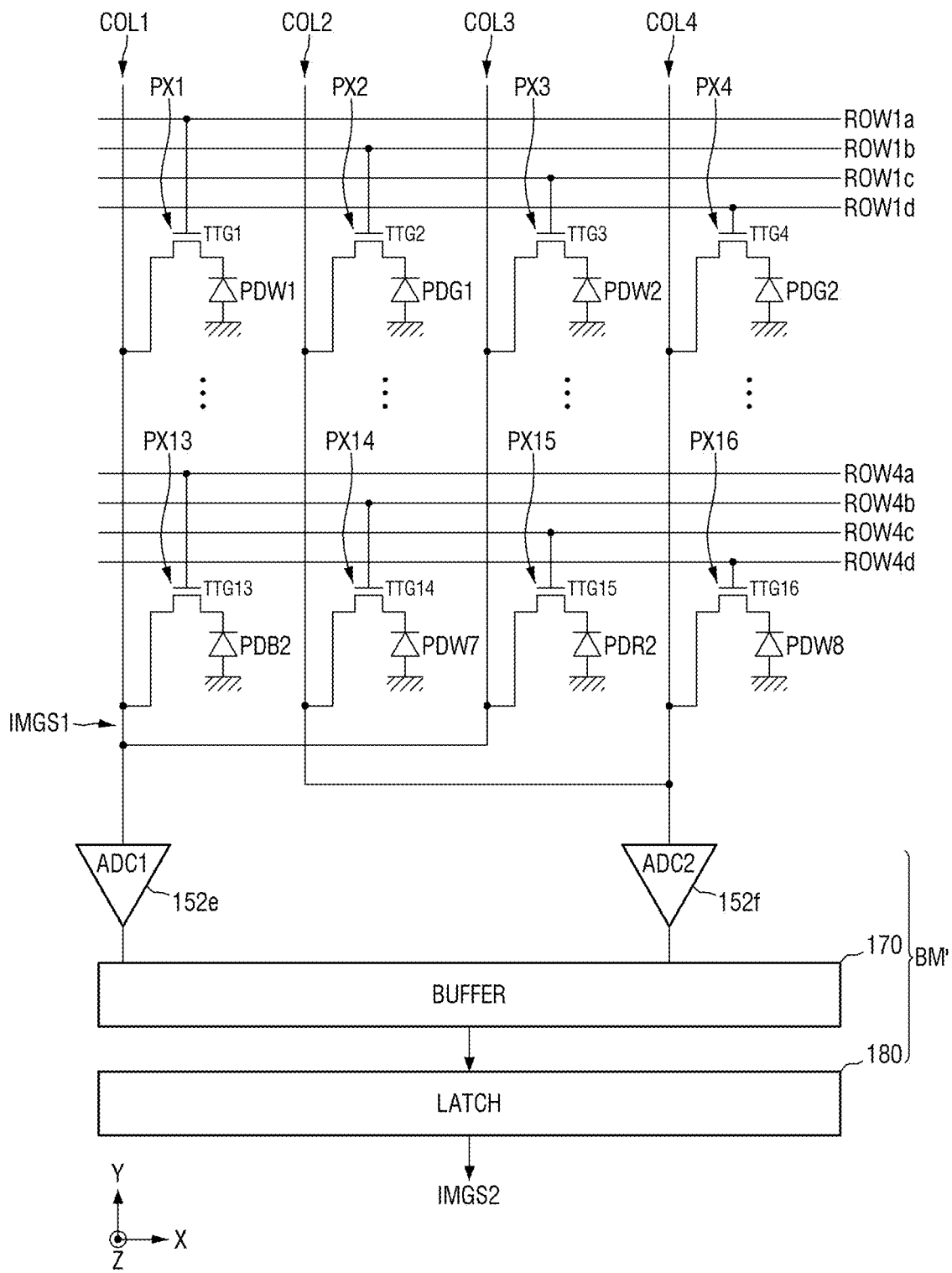
FIG. 14 is a circuit diagram of an image sensor according to some embodiments.

FIG. 14 is a circuit diagram of an image sensor according to some embodiments.

Referring to FIG. 14, the image sensor 100 may include a binning module BM'. The binning module BM' may include a first analog to digital converter 152e, a second to analog to digital converter 152f, the buffer 170 and the latch 180.

The first analog to digital converter 152e may be connected to the first column line COL1 and the third column line COL3. The second analog to digital converter 152f may be connected to the second column line COL2 and the fourth column line COL4. For example, the first analog to digital converter 152e may be connected to the first pixel PX1, the third pixel PX3, the fifth pixel PX5, the seventh pixel PX7, the ninth pixel PX9, the eleventh pixel PX11, the thirteenth pixel PX13 and the fifteenth pixel PX15 via the first and third column lines COL1 and COL3. The second analog to digital converter 152f may be connected to the second pixel PX2, the fourth pixel PX4, the sixth pixel PX6, the eighth pixel PX8, the tenth pixel PX10, the twelfth pixel PX12, and the fourteenth pixel PX14 and the sixteenth pixel PX16 via the second and fourth column lines COL2 and COL4. In this case, the binning module BM' may be a circuit dedicated to a binning operation, as opposed to the binning module BM of FIG. 5, which may have different modes for binning and non-binning operations.

The first analog to digital converter 152e may respectively receive the pixel values from the pixels and perform binning thereon. The second analog to digital converter 152f may respectively receive the pixel values from the pixels and perform binning thereon.

Figure 15:
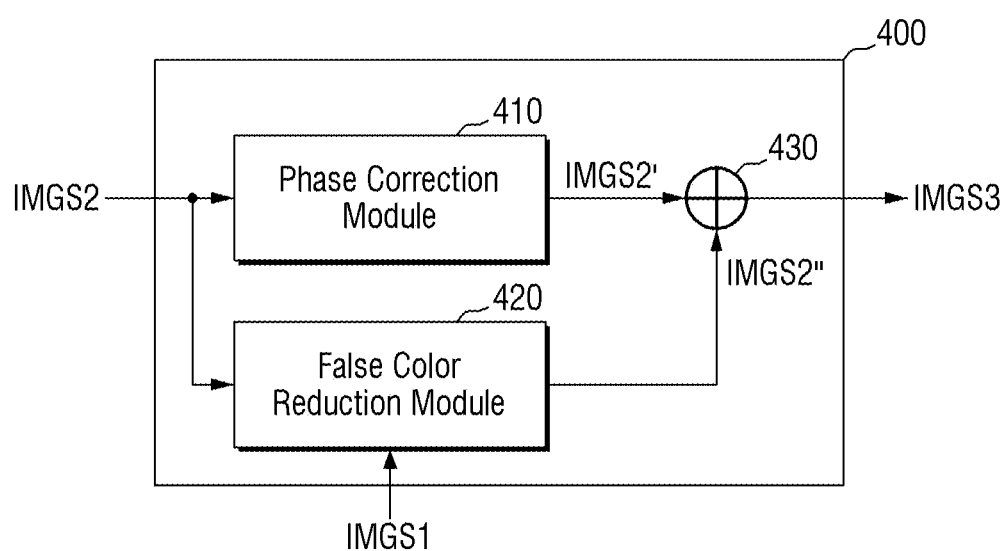
FIG. 15 is a block diagram for illustrating a first image signal processor according to some embodiments.
Figure 16:
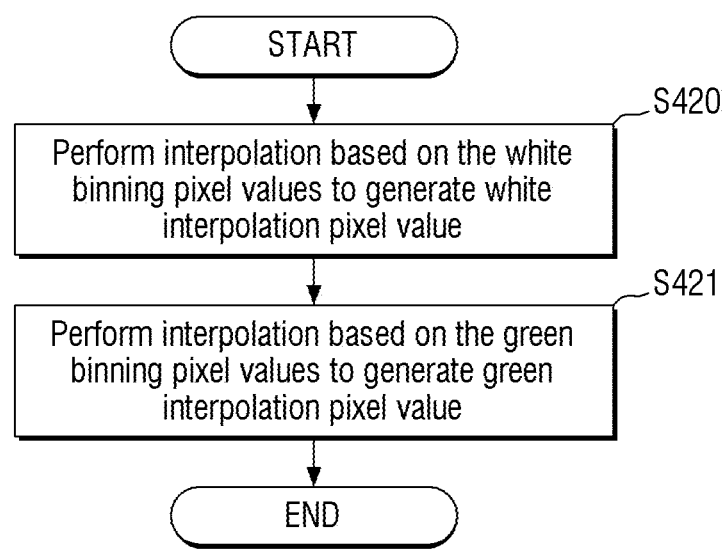
FIG. 16 is a flowchart for illustrating an operation of a phase correction module of FIG. 15.
Figure 17:
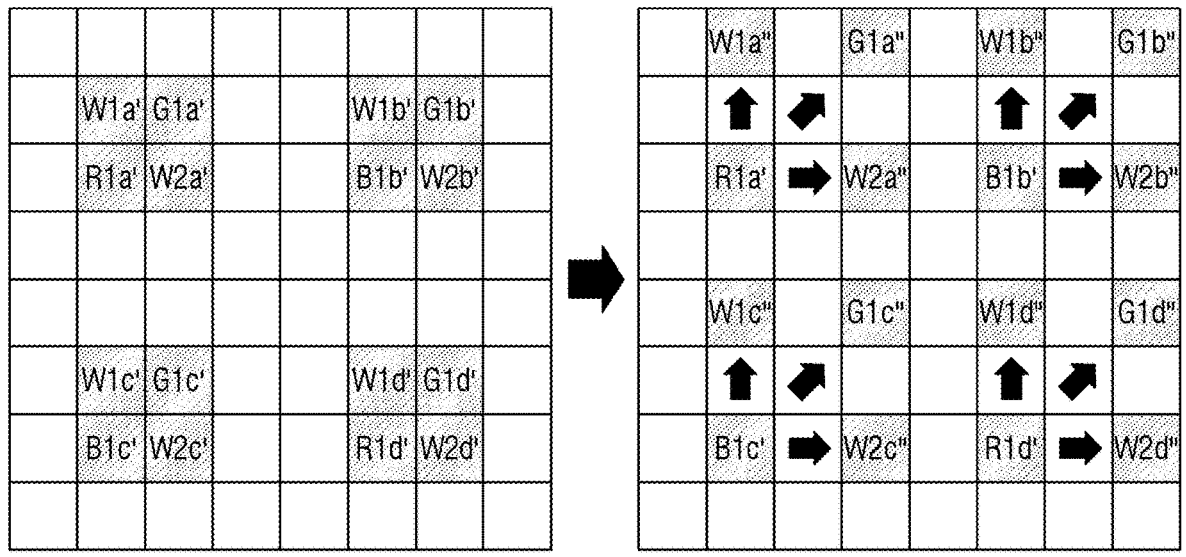
FIG. 17 and FIG. 18 are diagrams for illustrating a phase correction method.
Figure 17:
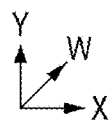
Figure 18:
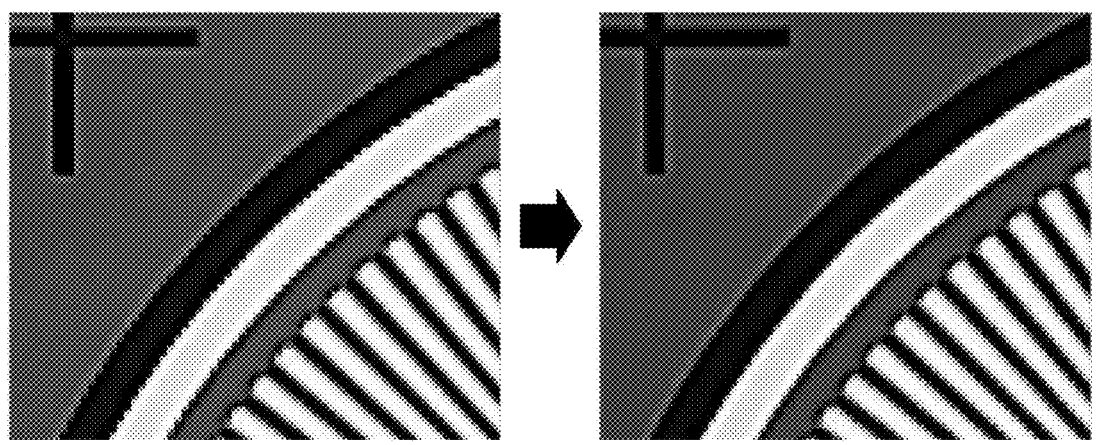

FIG. 15 is a block diagram for illustrating a first image signal processor according to some embodiments. FIG. 16 is a flowchart for illustrating an operation of a phase correction module of FIG. 15. FIG. 17 and FIG. 18 are diagrams for illustrating a phase correction method.

Referring to FIG. 15, the first image signal processor 400 may include a phase correction module 410, a false color reduction module 420 and an adder 430. The first image signal processor 400 may perform correction on the second image signal IMGS2 to generate and output the third image signal IMGS3. However, embodiments of the present disclosure are not limited thereto. The second image signal processor 900 may perform correction on the second image signal IMGS2 to generate the third image signal IMGS3. For example, the second image processor 900 included in the application processor may perform correction on the second image signal IMGS2.

The phase correction module 410 may perform phase correction on the second image signal IMGS2 to generate a second image signal IMGS2'.

Referring to FIG. 16 and FIG. 17, the phase correction module 410 may perform interpolation based on the white binned pixel values to generate a white interpolated pixel value in S420. Further, the phase correction module 410 may perform interpolation based on the green binned pixel values to generate a green interpolated pixel value in S421.

Unlike the second image signal IMGS2, the second image signal IMGS2' may include a first white interpolated pixel value W1a", a second white interpolated pixel value W2a", a first green interpolated pixel value G1a", a first white interpolated pixel value W1b", a second white interpolated pixel value W2b", a first green interpolated pixel value G1b", a first white interpolated pixel value W1c", a second white interpolated pixel value W2c", a first green interpolated pixel value G1c", a first white interpolated pixel value W1d", a second white interpolated pixel value W2d" and a first green interpolated pixel value G1d".

For example, the phase correction module 410 may perform interpolation based on a plurality of white binned pixel values to generate a plurality of white interpolated pixel values. For example, the second white interpolated pixel value W2a" may be generated by performing the interpolation based on the first white binned pixel value W1a', the first white binned pixel value W1b', the second white binned pixel value W2b', the first white binned pixel value W1c', the second white binned pixel value W2c', the first white binned pixel value W1d' and the second white binned pixel value W2d'. Further, the phase correction module 410 may perform the interpolation based on a plurality of green binned pixel values to generate a plurality of green interpolated pixel values.

In this regard, the plurality of white interpolated pixel values and the plurality of green interpolated pixel values may have positions different from those in the second image signal IMGS2. Accordingly, spacings between the plurality of pixel values may be constantly changed. As shown in FIG. 18, jagged artifacts may be suppressed to improve image quality.

In this regard, the first and second red binned pixel values R1a' and R2d' and the first and second blue binned pixel values B1b' and B2c' may not be changed.

Figure 19:
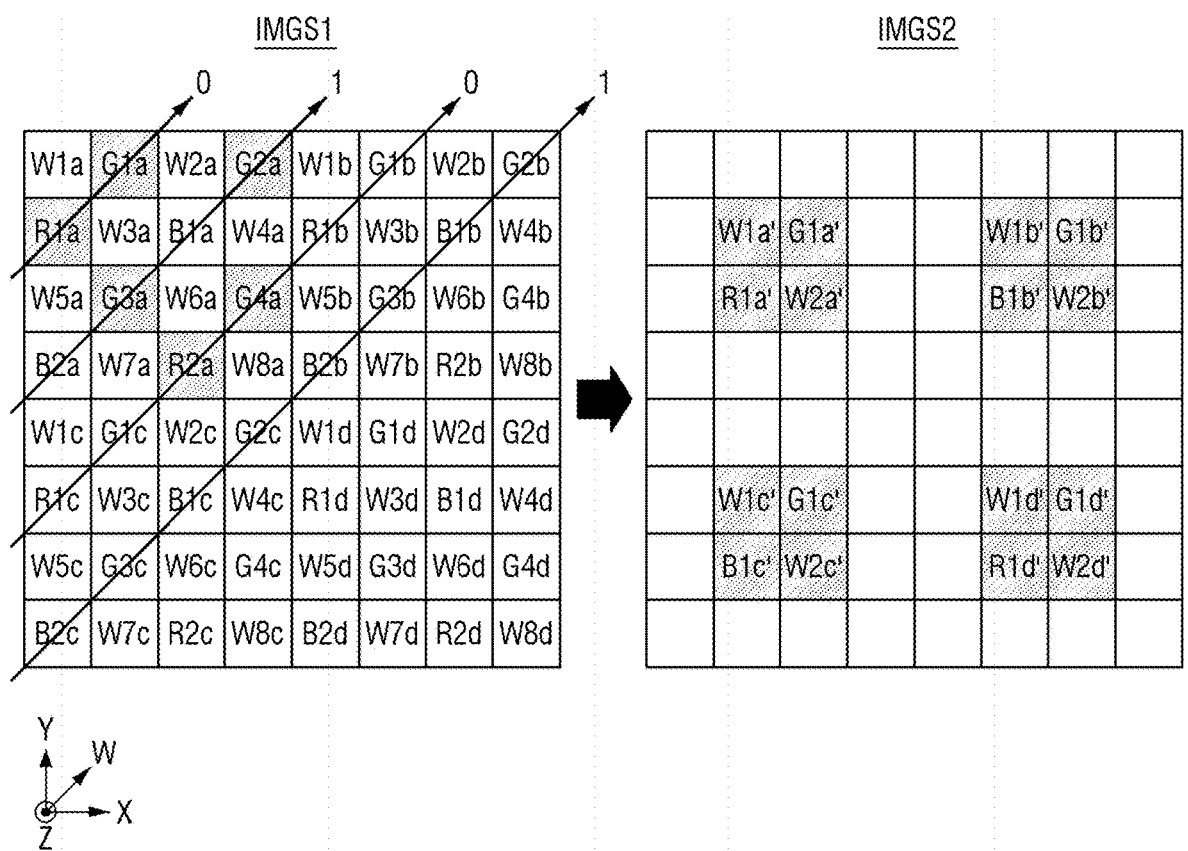
FIG. 19 is a diagram for illustrating a first image signal having a high frequency.

FIG. 19 is a diagram for illustrating a first image signal having a high frequency.

Referring to FIG. 19, the first image signal IMGS1 may include a high-frequency component in the fourth direction W. For example, the first image signal IMGS1 may include an edge component in the diagonal direction. For example, the pixel values in the fourth direction W may have 1 and 0 which are repeatedly alternated with each other by a predetermined spacing (e.g., may have 1's for all pixels in a first row in the fourth direction W, and 0's for all pixels in a second row in the fourth direction W adjacent to the first row). Accordingly, the first image signal IMGS1 may have the high frequency component and may include the edge component.

The first green binned pixel value G1a' may correspond to an average of 0 value and 1 value. In this regard, the binning module BM may act as a low pass filter. For example, the high frequency component in the diagonal direction may be removed from the first green binned pixel value G1a'. However, the first red binned pixel value R1a' may correspond to 0. For example, the high frequency component in the diagonal direction may not be removed from the first red binned pixel value R1a', the second red binned pixel value R2d', the first blue binned pixel value B1b' and the second blue binned pixel value B2c'. Thus, a false color may occur.

Figure 20:
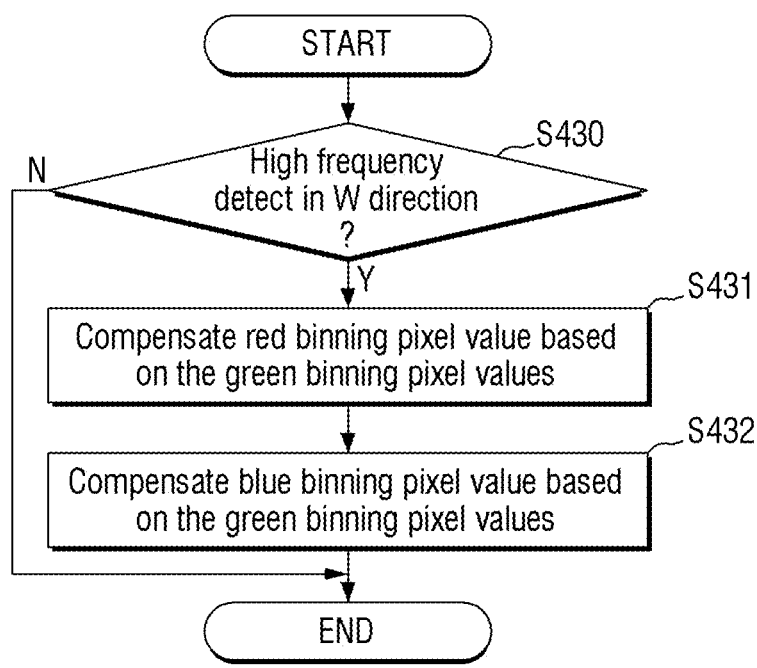
FIG. 20 is a flowchart for illustrating an operation of the false color reduction module of FIG. 15.
Figure 21:
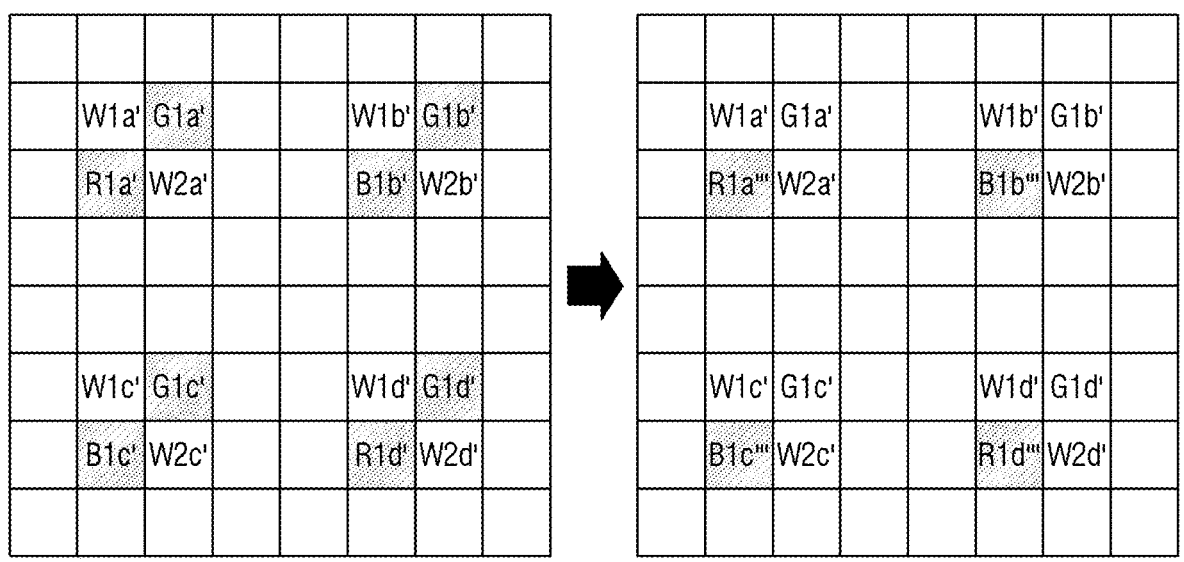
FIG. 21 and FIG. 22 are diagrams for illustrating a false color reduction method.
Figure 22:
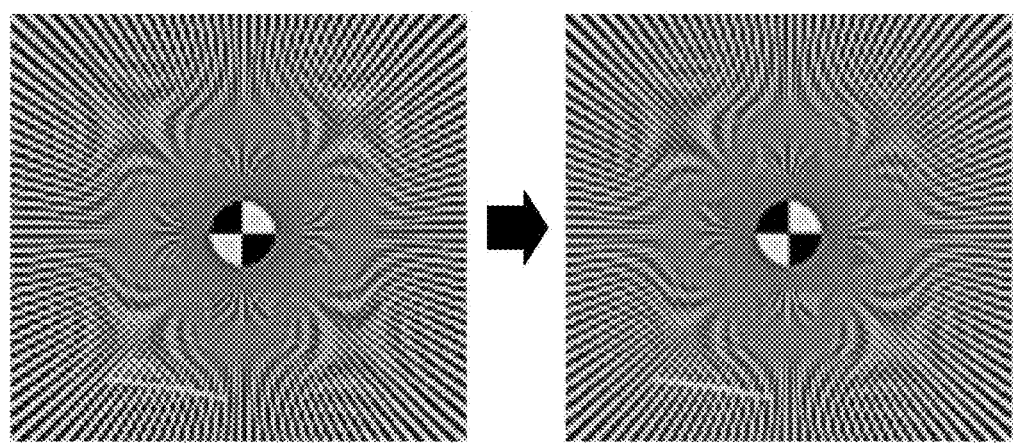

FIG. 20 is a flowchart for illustrating an operation of the false color reduction module of FIG. 15. FIG. 21 and FIG. 22 are diagrams for illustrating a false color reduction method.

Referring to FIG. 15 and FIG. 20, the false color reduction module 420 may detect the high-frequency component in the fourth direction W from the first image signal IMGS1 in S430. In this regard, the false color reduction module 420 may detect the high frequency component in the diagonal direction using the first image signal IMGS1 instead of the second image signal IMGS2.

When the high-frequency component in the fourth direction W is not detected from the first image signal IMGS1 (S430-N), false color reduction correction is not performed. When the high-frequency component in the fourth direction W is detected from the first image signal IMGS1 (S430-Y), the false color reduction module 420 may compensate for the red binned pixel value based on the green binned pixel values in S431, and may compensate for the blue binned pixel value based on the green binned pixel values in S432.

Referring to FIG. 21, a second image signal IMGS2" may include a first red corrected pixel value R1a''', a first red corrected pixel value R1d''', a first blue corrected pixel value B1b''' and a first blue corrected pixel value B1c''', and may include other pixel values (e.g., green and white pixel values) from second image signal IMGS2.

The false color reduction module 420 may correct the false color of the first red binned pixel value R1a' using components of the plurality of first green binned pixel values G1a', G1b', G1c', and G1d'. For example, when the high-frequency component in the fourth direction W is detected, the components of the first green binned pixel value G1a' and the first green binned pixel value G1d' arranged in the fourth direction W may be subtracted from the first red binned pixel value R1a'. Further, the components of the first green binned pixel value G1b' and the first green binned pixel value G1c' that are not arranged in the fourth direction W may be added to the first red binned pixel value R1a'. Accordingly, the first red corrected pixel value R1a''' in which the false color of the first red binned pixel value R1a' is corrected may be generated. Each of the first red corrected pixel value R1d''', the first blue corrected pixel value B1b''' and the first blue corrected pixel value B1c''' may be generated in the same manner. As shown in FIG. 22, the false color may be corrected using the above correction method when the high-frequency component in the fourth direction W is present.

Figure 23:
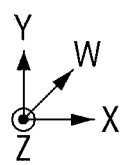
FIG. 23 is a diagram for illustrating a third image signal output from the first image signal processor.

FIG. 23 is a diagram for illustrating a third image signal output from the first image signal processor.

Referring to FIG. 15 and FIG. 23, the adder 430 may add the second image signal IMGS2" to the second image signal IMGS2'. That is, the first red binned pixel values R1a' and R1d' and the first blue binned pixel values B1b' and B1c' of the second image signal IMGS2' may be respectively replaced with the first red corrected pixel values R1a''' and R1d''', and the first blue corrected pixel values B1b''' and B1c'''. Accordingly, the adder 430 may output the third image signal IMGS3 with improved image quality.

Figure 24:
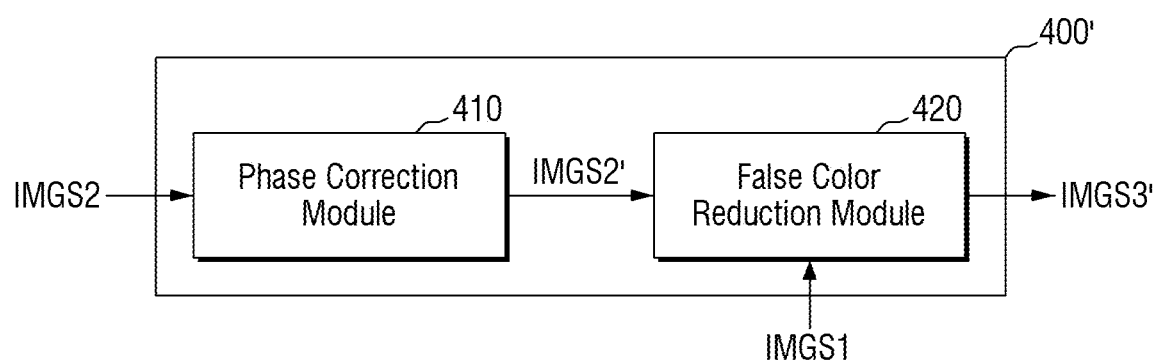
FIG. 24 is a block diagram for illustrating a second image signal processor according to some embodiments.

FIG. 24 is a block diagram for illustrating a second image signal processor according to some embodiments.

Referring to FIG. 24, an image signal processor 400' may include a phase correction module 410 and a false color reduction module 420 connected to each other in series. The phase correction module 410 may perform the phase correction on the second image signal IMGS2, and then, the false color reduction module 420 may perform the false color reduction correction using the first image signal IMGS1 and the second image signal IMGS2' as inputs. Accordingly, the third image signal IMGS3' may be output.

Hereinafter, an image sensor 100' according to some further embodiments will be described with reference to FIG. 25 to FIG. 27.

Figure 25:
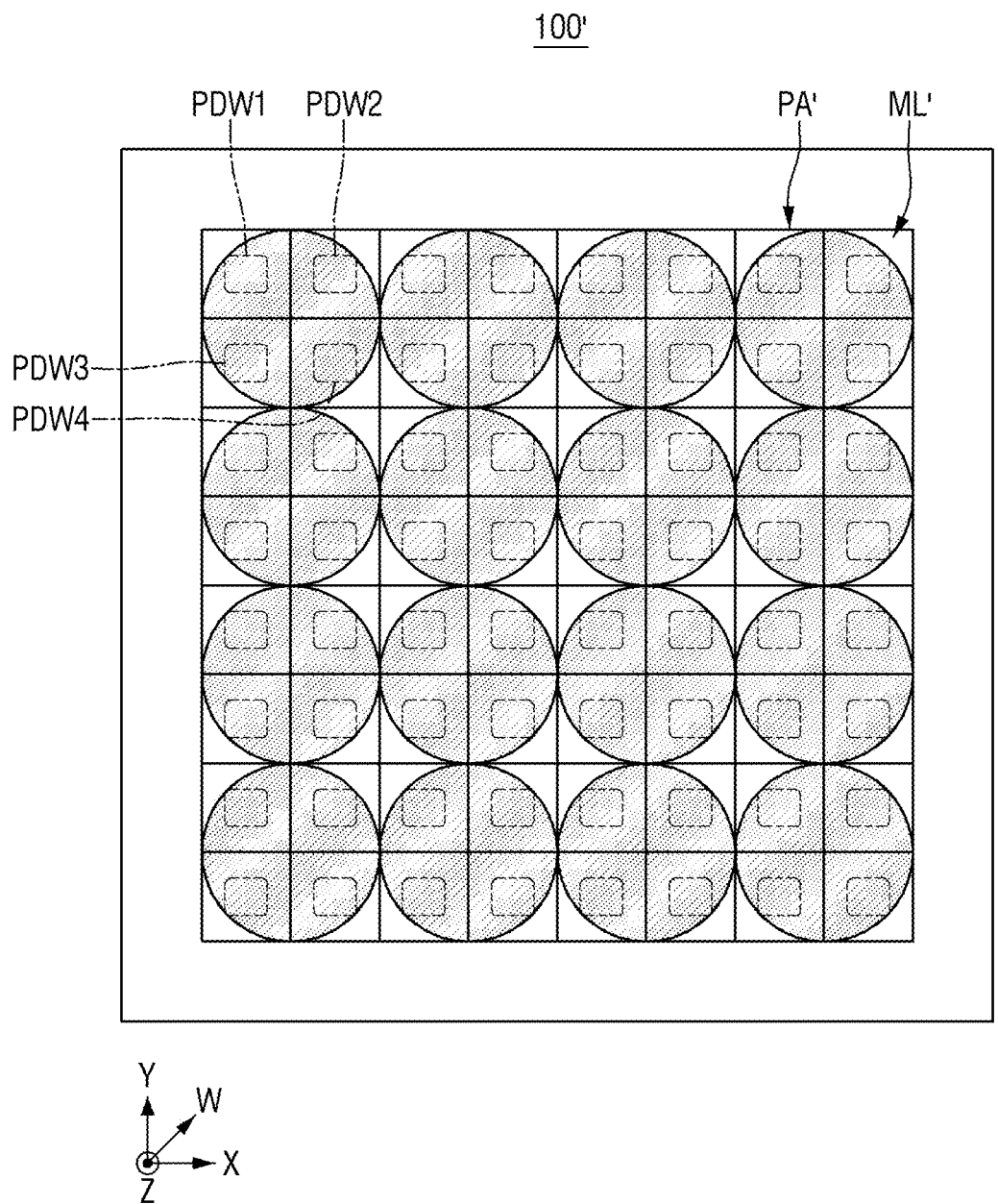
FIG. 25 is a top view of an image sensor according to some embodiments.

FIG. 25 is a top view of an image sensor according to some embodiments. FIG. 26 is a diagram for illustrating a first quad image signal generated from FIG. 25. FIG. 27 is a circuit diagram of an image sensor of FIG. 25. For convenience of description, portions duplicate with those as described using FIG. 1 to FIG. 24 are briefly described or omitted.

Referring to FIG. 25, the image sensor 100' may include a plurality of pixel groups. Each of the plurality of pixel groups may include a plurality of pixels. For example, each pixel group may include 4 pixels. In this embodiment, a first white pixel group may include first to fourth white photodiodes PDW1 to PDW4. A single micro lens ML' may cover all of pixels of the first white pixel group. The first to fourth white photodiodes PDW1 to PDW4 may convert light passing through the micro lens ML' into electrical signals. For example, the image sensor 100' may include a pixel array PA' corresponding to a quadra cell. However, embodiments of the present disclosure are not limited thereto. The image sensor 100' may correspond to a nonacell.

Referring to FIG. 25 and FIG. 26, the pixel array PA' may output a first quad image signal IMGSQ1. The first quad image signal IMGSQ1 may include the first to eighth white pixel values W1a to W8a, the first to fourth green pixel values G1a to G4a, the first and second red pixel values R1a and R2a and the first and second blue pixel values B1a and B2a. In this regard, one pixel value may correspond to a pixel value obtained by binning pixel values from one pixel group.

Figure 27:
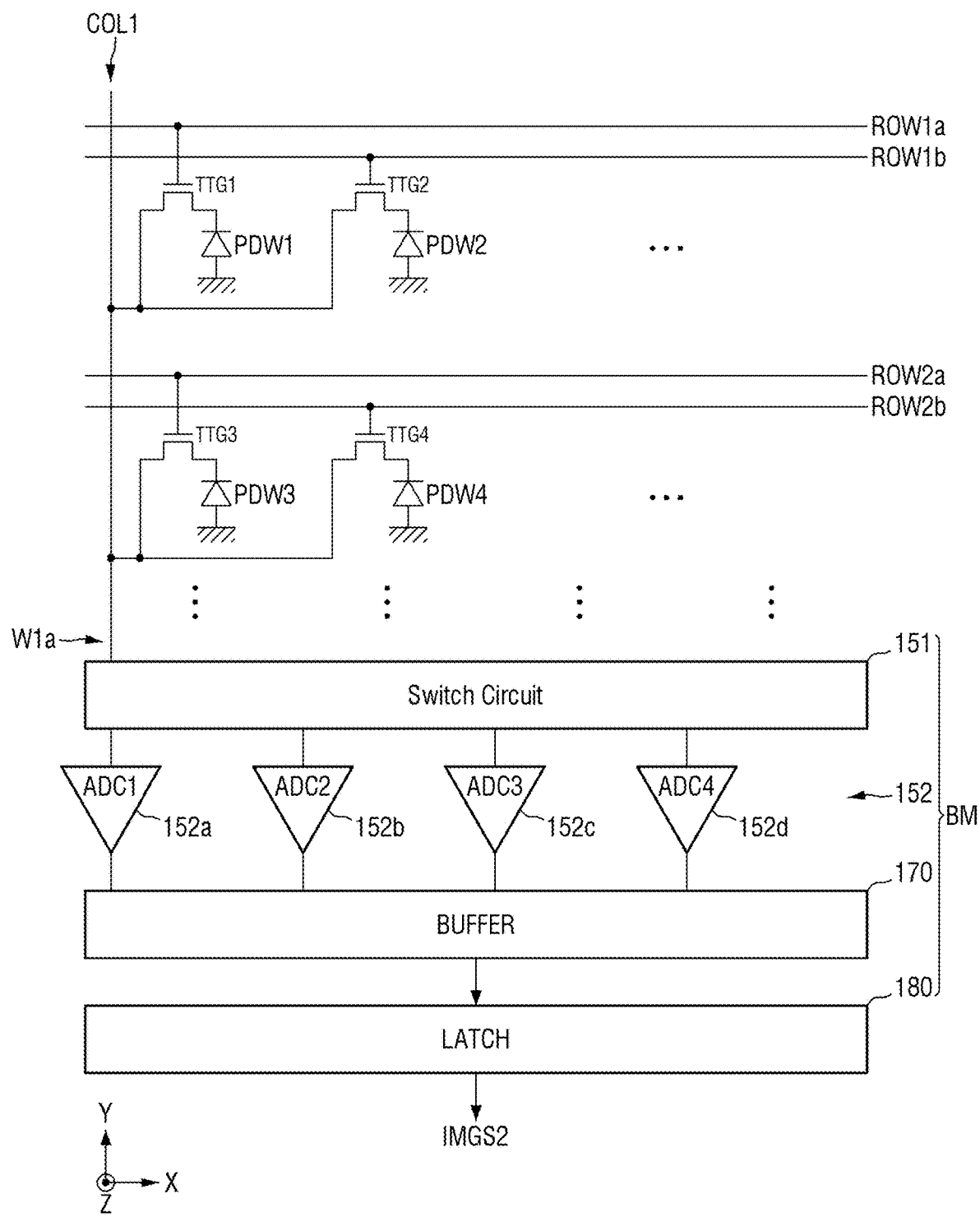
FIG. 27 is a circuit diagram of an image sensor of FIG. 25.

Referring to FIG. 27, the first to fourth white photodiodes PDW1 to PDW4 may be connected to the first row lines ROW1*a* and ROW1*b*, the second row lines ROW2*a* and ROW2*b* and the first column line COL1. The first and second white photodiodes PDW1 and PDW2 may be arranged in the first direction. The third and fourth white photodiodes PDW3 and PDW4 may be arranged in the first direction.

The electrical signals respectively output from the first to fourth white photodiode PDW1 to PDW4 may be binned to generate the first white pixel value W1*a*. In this regard, the first white pixel value W1*a* may be an analog signal and may be converted into a digital signal via the analog to digital converter 152.

Although the embodiments of the present disclosure have been described above with reference to the accompanying drawings, the present disclosure is not limited to the embodiments and may be implemented in various different forms. Those of ordinary skill in the technical field to which the present disclosure belongs will be able to understand that the present disclosure may be implemented in other specific forms without changing the technical idea or essential characteristics of the present disclosure. Therefore, it should be understood that the embodiments as described above are illustrative in all respects and not restrictive.

What is claimed is:

1. An image sensor comprising:
   a first pixel, a second pixel, a third pixel and a fourth pixel arranged in a first direction;
   a fifth pixel, a sixth pixel, a seventh pixel and an eighth pixel respectively disposed adjacent to the first to fourth pixels in a second direction intersecting the first direction, wherein the fifth to eighth pixels are arranged in the first direction;
   a ninth pixel, a tenth pixel, an eleventh pixel and a twelfth pixel respectively disposed adjacent to the fifth to eighth pixels in the second direction, wherein the ninth to twelfth pixels are arranged in the first direction;
   a thirteenth pixel, a fourteenth pixel, a fifteenth pixel and a sixteenth pixel respectively disposed adjacent to the ninth to twelfth pixels in the second direction, wherein the thirteenth to sixteenth pixels are arranged in the first direction;
   a first analog to digital converter connected to the first pixel, the third pixel, the fifth pixel, the seventh pixel, the ninth pixel, the eleventh pixel, the thirteenth pixel and the fifteenth pixel; and
   a second analog to digital converter connected to the second pixel, the fourth pixel, the sixth pixel, the eighth pixel, the tenth pixel, the twelfth pixel, the fourteenth pixel and the sixteenth pixel,
   wherein each of the first to sixteenth pixels is configured to output first to sixteenth pixel signals, respectively,
   wherein the first analog to digital converter is configured to:
   perform binning based on only the first pixel signal, the third pixel signal, the ninth pixel signal and the eleventh pixel signal to output a first binned signal; and
   perform binning based on only the fifth pixel signal and the fifteenth pixel signal to output a second binned signal, and
   wherein the second analog to digital converter is configured to:
   perform binning based on only the sixth pixel signal, the eighth pixel signal, the fourteenth pixel signal and the sixteenth pixel signal to output a third binned signal; and
   perform binning based on only the second pixel signal, the fourth pixel signal, the tenth pixel signal, and the twelfth pixel signal to output a fourth binned signal.

2. The image sensor of claim 1, wherein each of the first, third, sixth, eighth, ninth, eleventh, fourteenth and sixteenth pixels includes a white color filter, and
   wherein each of the second, fourth, tenth and twelfth pixels includes a green color filter.

3. The image sensor of claim 2, wherein each of the fifth and fifteenth pixels includes a red color filter, and
   wherein each of the seventh and thirteenth pixels includes a blue color filter.

4. The image sensor of claim 2, wherein each of the fifth and fifteenth pixels includes a blue color filter, and
   wherein each of the seventh and thirteenth pixels includes a red color filter.

5. The image sensor of claim 1, wherein each of the first and second analog to digital converters is configured to not perform binning based on the seventh pixel signal and the thirteenth pixel signal.

6. The image sensor of claim 1, wherein the image sensor further comprises:
   seventeenth to twentieth pixels sequentially adjacent to the fourth pixel in the first direction and arranged in the first direction;
   twenty-first to twenty-fourth pixels respectively disposed adjacent to the seventeenth to twentieth pixels in the second direction, wherein the twenty-first to twenty-fourth pixels are arranged in the first direction;
   twenty-fifth to twenty-eighth pixels respectively disposed adjacent to the twenty-first to twenty-fourth pixels in the second direction, wherein the twenty-fifth to twenty-eighth pixels are arranged in the first direction;
   twenty-ninth to thirty-second pixels respectively disposed adjacent to the twenty-fifth to twenty-eighth pixels in the second direction, wherein the twenty-ninth to thirty-second pixels are arranged in the first direction;
   a third analog to digital converter connected to the seventeenth pixel, the nineteenth pixel, the twenty-first pixel, the twenty-third pixel, the twenty-fifth pixel, the twenty-seventh pixel, the twenty-ninth pixel, and the thirty-first pixel; and
   a fourth analog to digital converter connected to the eighteenth pixel, the twentieth pixel, the twenty-second pixel, the twenty-fourth pixel, the twenty-sixth pixel, the twenty-eighth pixel, the thirtieth pixel, and the thirty-second pixel,
   wherein each of the seventeenth to thirty-second pixels is configured to output seventeenth to thirty-second pixel signals, respectively,
   wherein the third analog to digital converter is configured to:
   perform binning based on only the seventeenth pixel signal, the nineteenth pixel signal, the twenty-fifth pixel signal and the twenty-seventh pixel signal to output a fifth binned signal; and
   perform binning based on only the twenty-third pixel signal and the twenty-ninth pixel signal to output a sixth binned signal,
   wherein the fourth analog to digital converter is configured to:
   performing binning based on only the twenty-second pixel signal, the twenty-fourth pixel signal, the thirtieth pixel signal and the thirty-second pixel signal to output a seventh binned signal; and perform binning based on only the eighteenth pixel signal, the twentieth pixel signal, the twenty-sixth pixel signal and the twenty-eighth pixel signal to output an eighth binned signal.

7. The image sensor of claim 6, wherein each of the third and fourth analog to digital converters is configured to not perform binning based on the twenty-first pixel signal and the thirty-first pixel signal.

8. The image sensor of claim 7, wherein each of the first and second analog to digital converters is configured to not perform binning based on the seventh pixel signal and the thirteenth pixel signal.

9. The image sensor of claim 1, wherein the first to sixteenth pixels are disposed on a first substrate, and
wherein the first and second analog digital converters are disposed on a second substrate under the first substrate.

10. The image sensor of claim 1, wherein the image sensor further comprises an image signal processor configured to perform correction on an image signal including the first to fourth binned signals,
wherein the image signal processor is configured to perform interpolation on the first binned signal, the third binned signal, and the fourth binned signal to generate a first interpolated binned signal, a third interpolated binned signal, and a fourth interpolated binned signal, respectively.

11. The image sensor of claim 10, wherein the image signal processor is configured to not perform interpolation on the second binned signal.

12. The image sensor of claim 10, wherein the image signal processor is configured to correct the second binned signal using a component of the fourth binned signal.

13. An image sensor comprising:
a first pixel array configured to output, for a sensed image, a plurality of first white pixel values, a plurality of first green pixel values, a plurality of first red pixel values, and a plurality of first blue pixel values;
a second pixel array configured to output, for the sensed image, a plurality of second white pixel values, a plurality of second green pixel values, a plurality of second red pixel values, and a plurality of second blue pixel values; and
a binning module connected to the first pixel array and the second pixel array,
wherein the binning module is configured:
to perform binning based on the first white pixel values to generate a first white binned pixel value;
to perform binning based on the first green pixel values to generate a first green binned pixel value;
to perform binning based on the first red pixel values to generate a first red binned pixel value;
to perform binning based on the second white pixel values to generate a second white binned pixel value;
to perform binning based on the second green pixel values to generate a second green binned pixel value;
to perform binning based on the second blue pixel values to generate a second blue binned pixel value;
to not perform binning based on the first blue pixel values; and
to not perform binning based on the second red pixel values.

14. The image sensor of claim 13, wherein the second pixel array is disposed adjacent to the first pixel array in a first direction,
wherein the binning module is disposed adjacent to the first and second pixel arrays in a second direction intersecting the first direction.

15. The image sensor of claim 14, wherein the image sensor further comprises a third pixel array configured to output a plurality of third white pixel values, a plurality of third green pixel values, a plurality of third red pixel values, and a plurality of third blue pixel values, wherein the third pixel array is disposed adjacent to the first pixel array in the second direction,
wherein the binning module is configured:
to perform binning based on the third white pixel values to generate a third white binned pixel value;
to perform binning based on the third green pixel values to generate a third green binned pixel value;
to perform binning based on the third blue pixel values to generate a third blue binned pixel value; and
to not perform binning based on the third red pixel values.

16. The image sensor of claim 13, wherein the image sensor further comprises an image signal processor configured to:
receive the first and second white binned pixel values, the first and second green binned pixel values, the first red binned pixel value and the second blue binned pixel value;
perform interpolation on white binned pixel values including the first and second white binned pixel values to generate first and second white interpolated pixel values; and
perform interpolation on green binned pixel values including the first and second green binned pixel values to generate first and second green interpolated pixel values.

17. The image sensor of claim 16, wherein the image signal processor is configured to not perform interpolation on the first red binned pixel value and the second blue binned pixel value.

18. The image sensor of claim 16, wherein the image signal processor is configured to, when a high-frequency component is detected from the first and second white pixel values, the first and second green pixel values, the first and second red pixel values, and the first and second blue pixel values, correct the first red binned pixel value using the first and second green binned pixel values, and to correct the second blue binned pixel value using the first and second green binned pixel values.

19. An image sensor comprising:
a first array of pixels having a color pattern formed in an n×m array and including at least first-color pixels, second-color pixels, and third color-pixels;
a second array of pixels adjacent to the first array of pixels and having the same color pattern formed in an n×m array as the first array of pixels, to include at least first-color pixels, second-color pixels, and third-color pixels;
a binning module configured to, for a sensed image:
perform binning on the first-color pixels of the first array, the first-color pixels of the second array, the second-color pixels of the first array, and the third-color pixels of the second array,
not perform binning on the third-color pixels of the first array, and
not perform binning on the second-color pixels of the second array.

20. The image sensor of claim 19, wherein:
the first array and second array each have more first-color pixels than second-color pixels and have more first-color pixels than third-color pixels.

* * * * *